(12) United States Patent
Takagi et al.

(10) Patent No.: US 6,418,088 B1
(45) Date of Patent: Jul. 9, 2002

(54) APPARATUS AND METHOD FOR REPRODUCING INFORMATION FROM A MAGNETO OPTICAL RECORDING MEDIUM BY THE MAGNETIC DOMAIN MAGNIFICATION METHOD

(75) Inventors: Naoyuki Takagi, Gifu; Atsushi Yamaguchi, Ogaki, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/367,934

(22) PCT Filed: Dec. 22, 1998

(86) PCT No.: PCT/JP98/05811

§ 371 (c)(1),
(2), (4) Date: Aug. 24, 1999

(87) PCT Pub. No.: WO99/34363

PCT Pub. Date: Jul. 8, 1999

(30) Foreign Application Priority Data

Dec. 25, 1997 (JP) .............................................. 9-357476

(51) Int. Cl.[7] .............................................. G11B 11/00
(52) U.S. Cl. .................. 369/13.02; 369/13.35
(58) Field of Search ........................ 369/13, 32, 275.1, 369/275.2, 275.3, 124, 47.1, 47.16, 13.02, 13.06, 13.09, 13.14, 13.47, 13.35, 13.22

(56) References Cited

U.S. PATENT DOCUMENTS

| | | | |
|---|---|---|---|
| 5,485,433 A | * | 1/1996 | Satomura et al. ............. 369/13 |
| 5,959,943 A | * | 9/1999 | Yonezawa et al. ............. 369/13 |
| 6,038,201 A | * | 3/2000 | Kim ............................. 369/48 |
| 6,269,056 B1 | * | 7/2001 | Birukawa et al. ............. 369/13 |

\* cited by examiner

*Primary Examiner*—Ali Neyzari
(74) *Attorney, Agent, or Firm*—Armstrong, Westerman & Hattori, LLP

(57) ABSTRACT

A laser beam is directed from an optical head (40) while an alternating magnetic field is applied from a magnetic head (52). A reproduced signal from the optical head (40) is input to a reproduced signal detecting circuit (45) through a reproduced signal amplifying circuit (41). The detected signal (CK) of discontinuous regions provided at prescribed intervals in the groove of a magneto-optical recording medium (1) is input to an external synchronous signal generating circuit (46) and, in response, an external synchronous signal (SYN) is generated. In synchronization with the external synchronous signal (SYN), the reproduced signal detecting circuit (45) calculates a difference between the reproduced signal generated when a magnetic field for magnetic domain magnification is applied and the reproduced signal generated when a magnetic field for magnetic domain erasure is applied. The difference is detected as a reproduced signal (RF). Accordingly, low frequency "winding" included in the reproduced signal from the optical head (40) is offset, resulting in a correct reproduced signal (RF).

17 Claims, 20 Drawing Sheets

FIG.4

APPARATUS AND METHOD FOR REPRODUCING INFORMATION FROM A MAGNETO OPTICAL RECORDING MEDIUM BY THE MAGNETIC DOMAIN MAGNIFICATION METHOD

TECHNICAL FIELD

The present invention relates to apparatuses and methods for reproducing information. More particularly, the present invention relates to an apparatus and method for reproducing information from a magneto-optical recording medium by the magnetic domain magnification method.

BACKGROUND ART

Magneto-optical recording media have drawn attention as rewritable recording media with large storage capacity and high reliability, and they have started to be put to practical use as computer memories. Currently, standardization of magneto-optical recording media with a storage capacity of 6.1 G bytes is in progress.

The technique of reproducing a signal by magnifying a magnetic domain, which has been transferred from a recording layer to a reproducing layer, by applying an alternating magnetic field during signal reproduction from a magneto-optical recording medium has also been developed (hereinafter, the technique is referred to as the reproduction-by-magnification method). Further, a magneto-optical recording medium capable of recording and/or reproducing a 14 G-byte signal by the technique above has been proposed.

In signal reproduction using the above described reproduction-by-magnification method, a signal is reproduced by transferring a magnetic domain of a recording layer, on which the signal is recorded, to a reproducing layer and magnifying the transferred magnetic domain by an externally applied alternating magnetic field. However, the distribution of double refraction in a substrate of a magneto-optical recording medium and the influence of tilt of the substrate, for example, cause a low frequency "wave" or "winding" in a reproduced signal RF as shown in FIG. 28. Although reproduced signal RF can be binarized by comparison with a prescribed threshold value TH, reproduced signal RF cannot be binarized correctly in the presence of such "winding."

Although high pass filters are effective in removing such low frequency "winding", they cannot remove "winding" sufficiently.

Japanese Patent Laying-Open No. 3-219427 discloses a binarization circuit capable of obtaining correct binary signals even if the extremes of reproduced signal amplitude are varied. The binarization circuit includes a peak bottom detecting circuit for detecting the maximum and minimum of a reproduced signal, a latch circuit for storing the extremum of the maximum or minimum of the detected amplitude, and a differential comparing circuit for comparing the extremum with the current amplitude, activating its output if the absolute value of the difference is larger than a preset value and the current amplitude is larger than the extremum, inactivating its output if the absolute value of the difference is larger than a preset value and the current amplitude is smaller than the extremum, and otherwise maintaining the state of its output. However, magneto-optical disk recording/reproducing apparatuses using the binarization circuit do not reproduce signals from magneto-optical disks by the magnetic domain magnification method. In signal reproduction, therefore, only a laser beam is directed and an alternating magnetic field is not applied.

DISCLOSURE OF THE INVENTION

An object of the present invention is to provide an information reproducing apparatus capable of obtaining a correct reproduced signal without low frequency "winding."

According to the present invention, an information reproducing apparatus for reproducing information from a magneto-optical recording medium includes a magnetic head, an optical head, and a reproduced signal detecting circuit. A magnetic head is provided to alternately apply, to a magneto-optical recording medium, a magnetic field in a first direction and a magnetic field in a second direction opposite to the first direction. The optical head is provided to irradiate the magneto-optical recording medium with a laser beam and generate a detected signal according to the reflected beam from the magneto-optical recording medium. The reproduced signal detecting circuit is provided to detect, as a reproduced signal, a difference between the detected signal from the optical head when the magnetic field in the first direction is applied and the detected signal from the optical head when the magnetic field in the second direction is applied.

Preferably, the reproduced signal detecting circuit includes a delay circuit and a differential circuit. The delay circuit is provided to delay the detected signal from the optical head. The differential circuit is provided to detect the difference based on the detected signal from the optical head and the delayed detected signal from the delay circuit.

In the information reproducing apparatus, when the magnetic field in the first direction is applied from the magnetic head to the magneto-optical recording medium, a magnetic domain transferred from a recording layer to a reproducing layer is magnified, and a detected signal is output from the optical head according to the reflected beam from the magnified magnetic domain. When the magnetic field in the second direction is applied from the magnetic head to the magneto-optical recording medium, however, the magnified magnetic domain is erased, and a detected signal is output from the optical head according to the reflected beam from the erased magnetic domain. Since the difference between the detected signal that is generated when the magnetic field is applied to magnify the magnetic domain and the detected signal that is generated when the magnetic field is applied to erase the magnetic domain is detected as a reproduced signal, low frequency "winding" included in the detected signal is offset. As a result, the information reproducing apparatus can obtain a correct reproduced signal.

BRIEF DESCRIPTION OF THE DRAWINGS

FIG. 4 is a block diagram showing an overall configuration of a magneto-optical disk recording/reproducing apparatus according to an embodiment of the present invention.

BEST MODES FOR CARRYING OUT THE INVENTION

Figure 1:
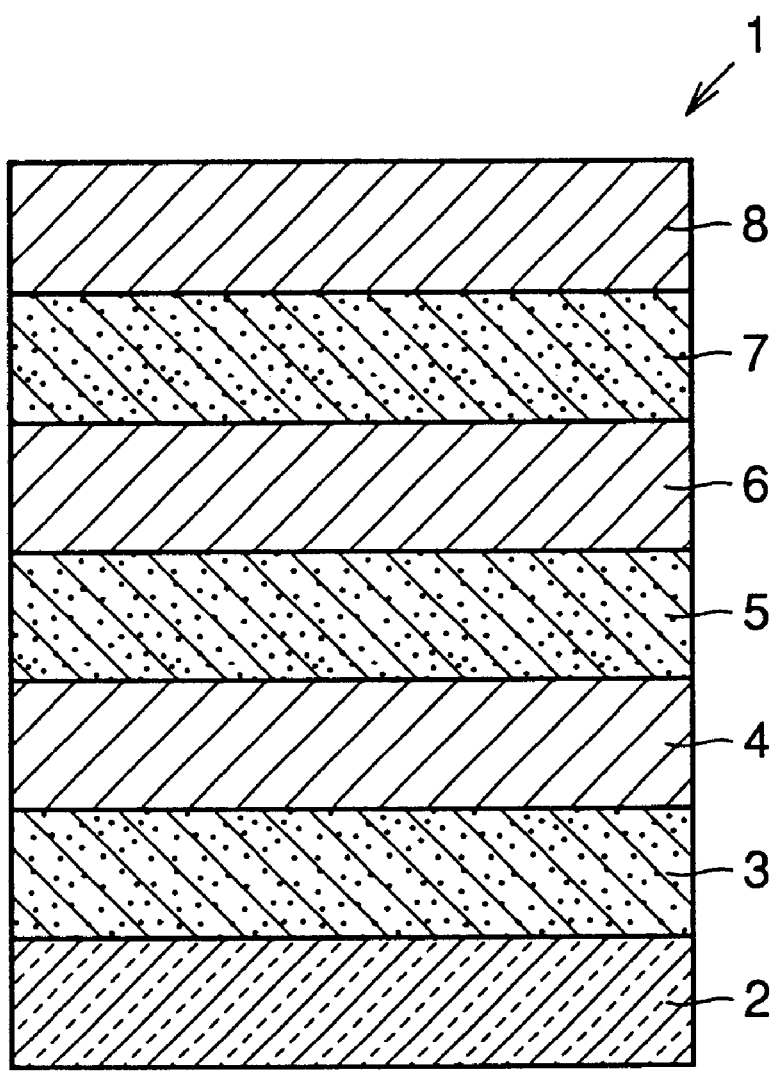
FIG. 1 is a cross sectional view showing a structure of a magneto-optical recording medium for the reproduction-by-magnification method.

The embodiment of the present invention will be described in detail below with reference to the drawings. The same or corresponding parts in the drawings are denoted by the same reference characters and their description will not be repeated.

Magneto-optical Recording Medium

First, a magneto-optical recording medium (magneto-optical disk) for signal reproduction in the present invention will be described. FIG. 1 is a cross sectional view showing a structure of a magneto-optical recording medium capable of signal reproduction by the magnetic domain magnification method.

Referring to FIG. 1, a magneto-optical recording medium 1 includes a transparent substrate 2, for example, of polycarbonate, an SiN interference layer 3 formed on substrate 2, a GdFeCo reproducing layer 4 formed on interference layer 3, an SiN non-magnetic layer 5 formed on reproducing layer 4, a TbFeCo recording layer 6 formed on non-magnetic layer 5, an SiN protection layer 7 formed on recording layer 6, and a heat sink layer 8 of a metal such as Pt, Au formed on protection layer 7. SiN of interference layer 3, GdFeCo of reproducing layer 4, SiN of non-magnetic layer 5, TbFeCo of recording layer 6, SiN of protection layer 7 and the metal of heat sink layer 8 are formed by magnetron sputtering. The film thickness of each layer is 30–100 nm for interference layer 3, 5–100 nm for reproducing layer 4, 1–100 nm for non-magnetic layer 5, 50–300 nm for recording layer 6, 5–100 nm for protection layer 7, and 10–100 nm for heat sink layer 8. Interference layer 3 is provided to improve the magnetic property of reproducing layer 4 compared with a case where reproducing layer 4 is directly deposited on substrate 2. Heat sink layer 8 is provided to allow recording or reproducing at high density by reducing the region where the magnetic films of reproducing layer 4 and recording layer 6 are raised to at least a prescribed temperature, when a signal is to be recorded and/or reproduced on/from magneto-optical recording medium 1. Although magneto-optical recording medium 1 is used as a medium for carrying out reproduction by transferring a magnetic domain of recording layer 6 to reproducing layer 4 and magnifying the domain therein as described below, heat sink layer 8 also effectively functions in the reproduction-by-magnification technique.

Figure 2A:
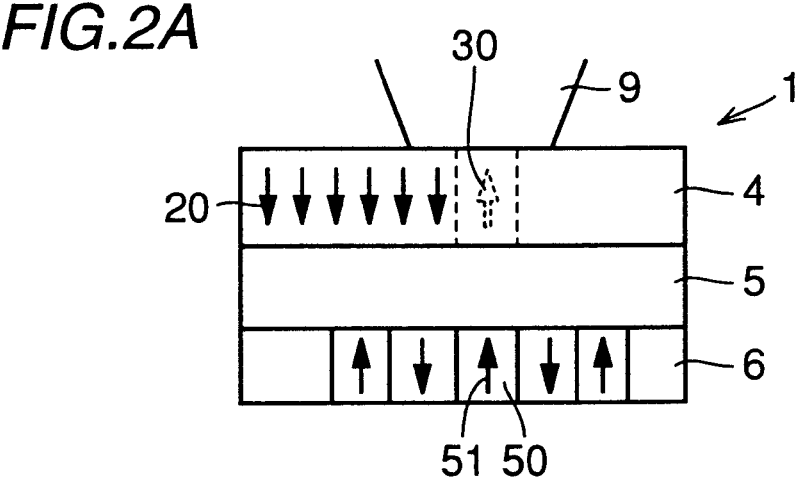
FIGS. 2A to 2C illustrate the principle of signal reproduction by the magnetic domain magnification method.
Figure 2B:
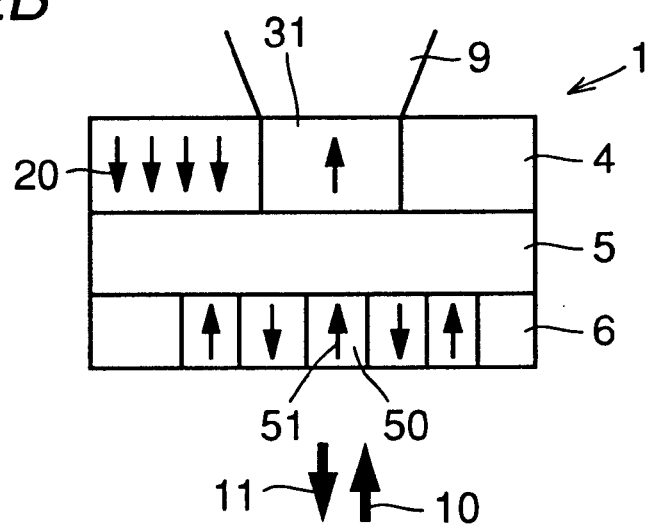
Figure 2C:
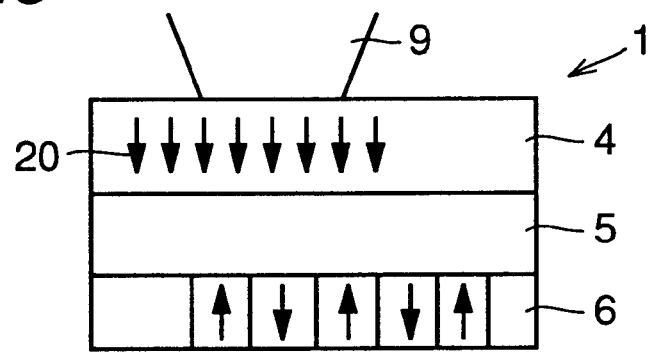
Figure 2C:

Referring to FIGS. 2A to 2C, a reproducing mechanism by magnetic domain magnification will be described. Referring to FIG. 2A, when magneto-optical recording medium 1 is irradiated with a laser beam 9 from the side of reproducing layer 4, the temperature of a magnetic domain 50 in recording layer 6 increases and a leakage magnetic field from magnetic domain 50 becomes stronger with the temperature increase. Although a laser beam with such intensity can be directed that causes magnetic domain 50 in recording layer 6 to be transferred through non-magnetic layer 5 to reproducing layer 4 by the leakage magnetic field, a laser beam with such intensity is directed here that does not cause magnetic domain 5 to be transferred to reproducing layer 4. Accordingly, only irradiation of magneto-optical recording medium 1 with laser beam 9 has not transferred, to reproducing layer 4, a magnetic domain 30 having magnetization in the same direction as magnetization 51 of magnetic domain 50 as shown in FIG. 2A. It is noted that reproducing layer 4 has initial magnetization 20 initialized in a prescribed direction.

Referring to FIG. 2B, when a magnetic field 10, of magnetic fields 10 and 11, in the same direction as magnetization 51 of magnetic domain 50 is externally applied while magnetic domain 50 is raised to at least a prescribed temperature by laser beam irradiation, a magnified magnetic domain 31 having magnetization in the same direction as magnetization 51 of magnetic domain 50 occurs in reproducing layer 4. That is, only irradiation with laser beam 9 does not transfer magnetic domain 50 to reproducing layer 4, and application of external magnetic field 10 successively causes transfer of magnetic domain 50 to reproducing layer 4 and magnification of magnetic domain 50. Thus, a reproduced signal is detected while magnetic domain 31 is magnified.

Referring next to FIG. 2C, after detection of the signal from magnified magnetic domain 31, magnetic field 11 in the opposite direction to magnetic field 10 used for transfer and magnification of the magnetic domain is applied to erase transferred and magnified magnetic domain 31. As described above, a signal is reproduced by carrying out the steps in FIGS. 2A to 2C, transferring magnetic domain 50 in recording layer 6 to reproducing layer 4, and magnifying magnetic domain 50.

Figure 3:
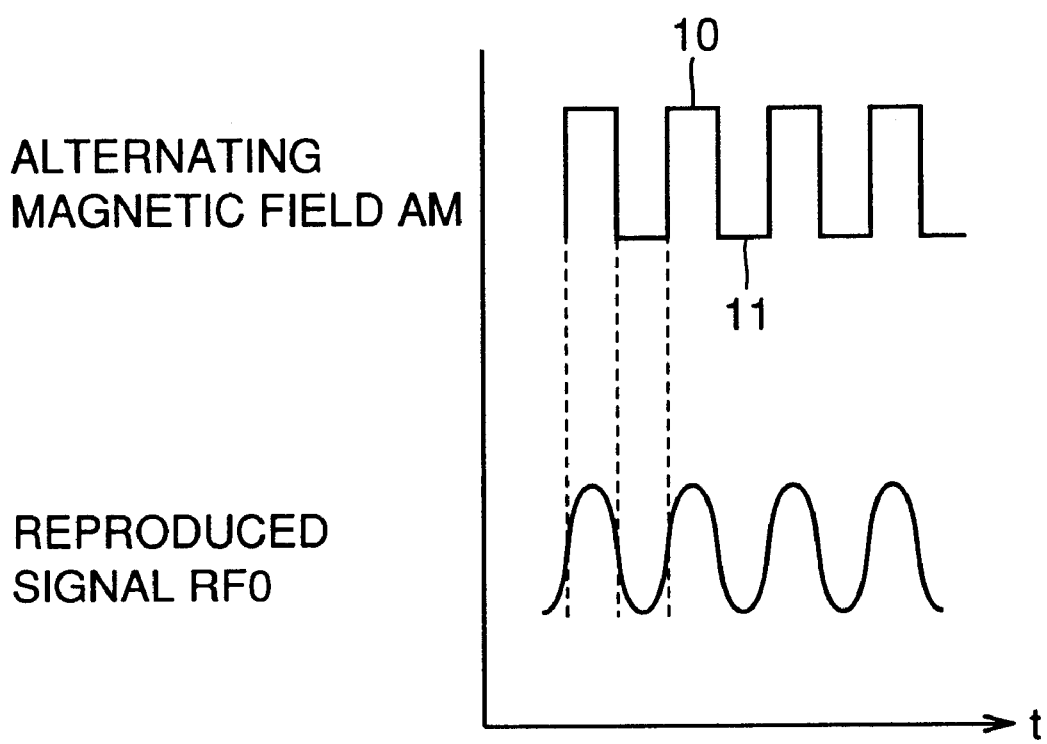
FIG. 3 is a waveform chart showing an alternating magnetic field applied to a magneto-optical recording medium when a magnetic domain is magnified for reproduction and a reproduced signal detected from the medium.

Referring to FIG. 3, the relations between an alternating magnetic field AM applied to magneto-optical recording medium 1 and a reproduced signal RF0 will be described. Magnetic field 10 of alternating magnetic field AM is used for transferring and magnifying a magnetic domain while magnetic field 11 in the opposite direction to magnetic field 10 is used for erasing the magnetic domain. Reproduced signal RF0 is detected in response to alternating magnetic field AM, and the level of reproduced signal RF0 becomes high when magnetic field 10 is applied and becomes low when magnetic field 11 is applied.

Although non-magnetic layer 5 is formed between reproducing layer 4 and recording layer 6 to transfer a magnetic domain by magnetostatic coupling in magneto-optical recording medium 1 described above, recording layer 6 may be formed directly on reproducing layer 4 instead. In such a medium, a magnetic domain is transferred by exchange coupling.

Magneto-optical Disk Recording/Reproducing Apparatus

Figure 4:
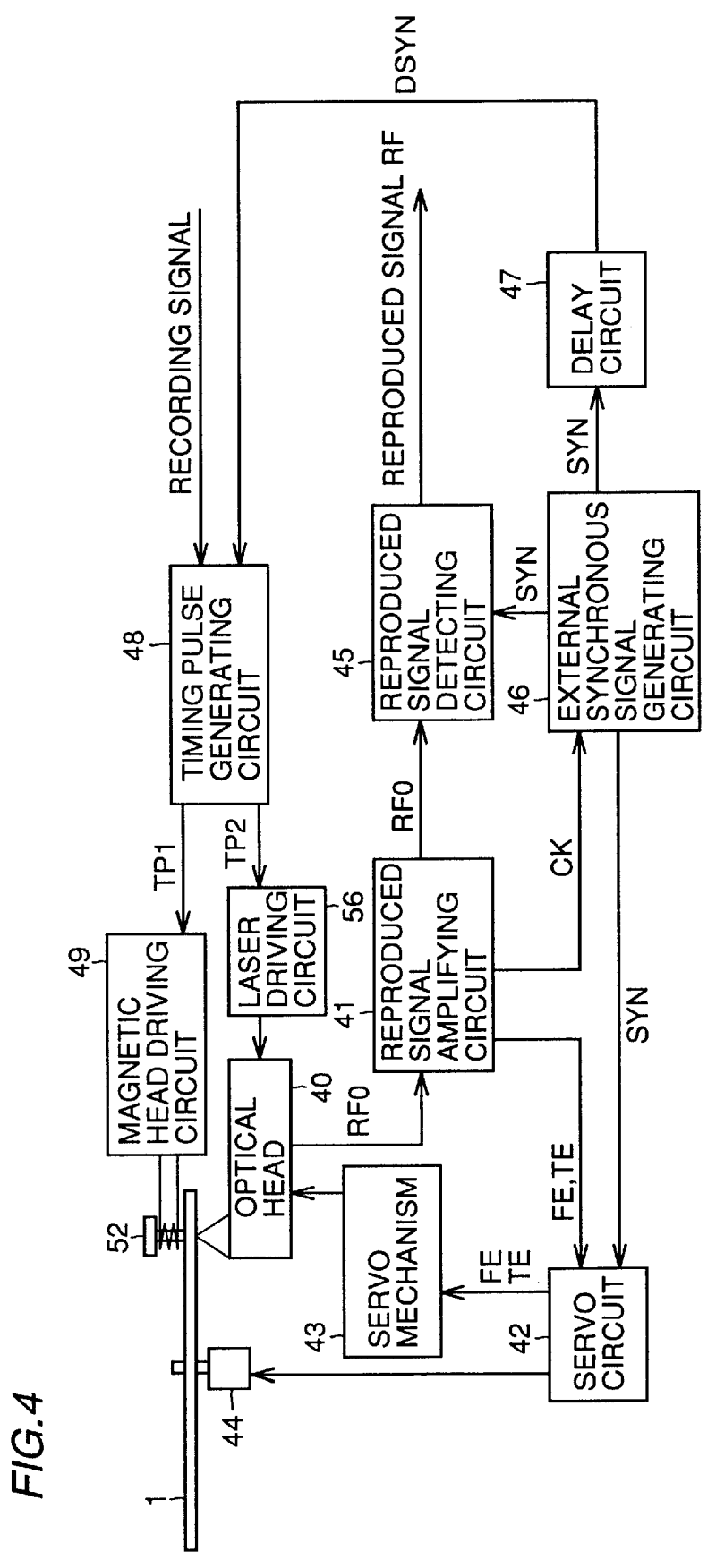

A magneto-optical disk recording/reproducing apparatus according to the embodiment of the present invention will be described in the following. Referring to FIG. 4, the magneto-optical disk recording/reproducing apparatus includes an optical head 40 for irradiating magneto-optical recording medium 1 with a laser beam and detecting a reproduced signal (detected signal) RF0 according to the reflected beam from magneto-optical recording medium 1, a reproduced signal amplifying circuit 41 for amplifying reproduced signal RF0 from optical head 40, a servo circuit 42 for receiving a focus error signal FE and a tracking error signal TE from reproduced signal amplifying circuit 41, sending the signals to a servo mechanism 43, and rotating a spindle motor 44 at a prescribed speed of rotation, a servo mechanism 43 for carrying out focus servo control and tracking servo control of an objective lens in optical head 40, a spindle motor 44 for rotating magneto-optical recording medium 1 at a prescribed speed of rotation, a reproduced signal detecting circuit 45 for receiving reproduced signal RF0 from reproduced signal amplifying circuit 41 and detecting a binary reproduced signal RF by the method described below, an external synchronous signal generating circuit 46 for generating an external synchronous signal SYN based on a clock signal CK from reproduced signal amplifying circuit 41, a delay circuit 47 for delaying external synchronous signal SYN from external synchronous signal generating circuit 46 by prescribed time, a timing pulse generating circuit 48 for generating a timing pulse TP1 for driving a magnetic head 52 and a timing pulse TP2 for driving a semiconductor laser in optical head 40 in response to a delayed external synchronous signal DSYN from delay circuit 47, a magnetic head driving circuit 49 for driving magnetic head 52 in response to timing pulse TP1 from timing pulse generating circuit 48, a magnetic head 52 for applying an alternating magnetic field to magneto-optical recording medium 1, and a laser driving circuit 56 for driving the semiconductor laser in optical head 40 in response to timing pulse TP2 from timing pulse generating circuit 48. When a signal is to be recorded, timing pulse generating circuit 48 generates timing pulse TP1 in synchronization with delayed synchronous signal DSYN from delay circuit 47 based on a record signal which is modulated by a prescribed method. Besides a reproduced signal according to the Kerr angle of rotation, optical head 40 detects focus error signal FE for focus servo control, tracking error signal TE for tracking servo control, and clock signal CK for synchronization control.

Generation of External Synchronous Signal

Figure 5:
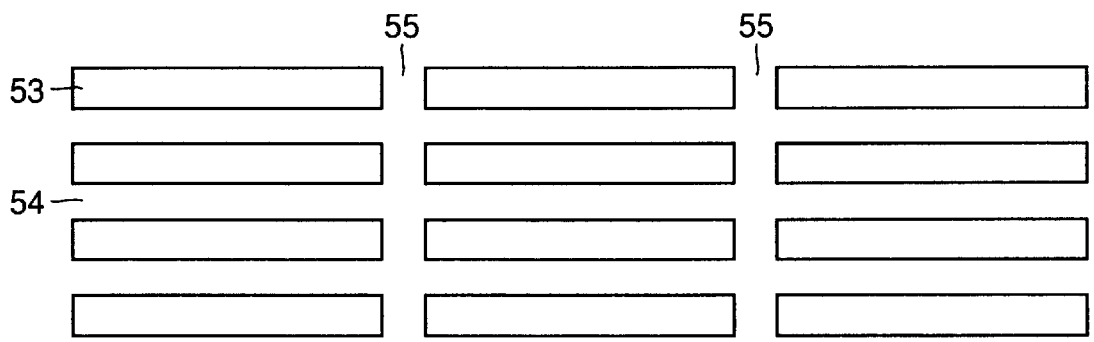
FIG. 5 is a plan view showing a land and groove structure of a magneto-optical disk.

Referring to FIGS. 5 to 10, generation of the external synchronous signal in external synchronous signal generating circuit 46 will be described below. Referring to FIG. 5, the track of magneto-optical recording medium 1 consists of a groove 53 and a land 54 and discontinuous regions 55 are provided at prescribed intervals in groove 53.

Figure 6:
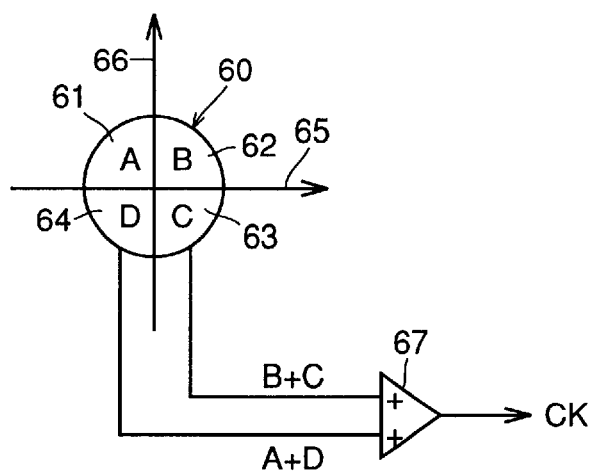
FIG. 6 is a diagram showing one example of the photo-detection portion included in the optical head in FIG. 4.

Referring to FIG. 6, a photodetector 60 provided in optical head 40 is divided into four regions 61 to 64, and the directions 65 and 66 in the figure are arranged correspondingly to the track direction (tangent direction of the track) and the tracking direction (perpendicular direction of the track), respectively. A laser beam is directed to groove 53 or land 54 of magneto-optical recording medium 1, and the reflected beam is detected in regions 61 to 64. The sum [B+C] of the intensity [B] of the reflected beam detected in region 62 and the intensity [C] of the reflected beam detected in region 63 is input to one terminal of an adder 67, and the sum [A+D] of the intensity [A] of the reflected beam detected in region 61 and the intensity [D] of the reflected beam detected in region 64 is input to the other terminal of adder 67. Adder 67 calculates the sum [A+B+C+D] of [B+C] and [A+D] and outputs the result as clock signal CK.

Figure 7:
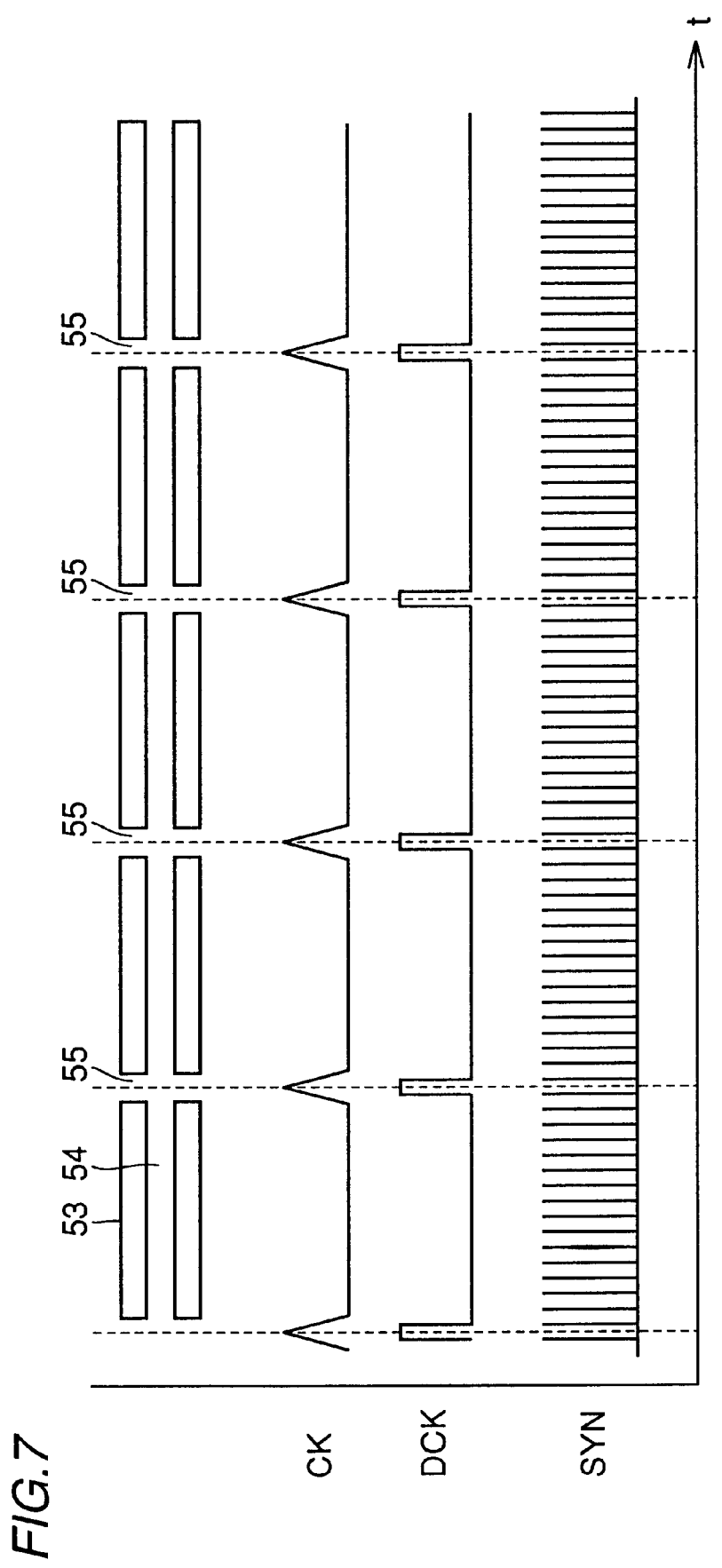
FIG. 7 is a timing chart showing an operation of the external synchronous signal generating circuit in FIG. 4 when the photo-detection portion shown in FIG. 6 is used.

Referring to FIG. 7, groove 53 of magneto-optical recording medium 1 includes discontinuous regions 55 at prescribed intervals, and therefore optical head 40 outputs clock signal CK as shown in FIG. 7 no matter which of groove 53 or land 54 is to be scanned by a laser beam. Clock signal CK output from optical head 40 is amplified in reproduced signal amplifying circuit 41 before it is input to external synchronous signal generating circuit 46. External synchronous signal generating circuit 46 generates a binary clock signal DCK by comparing clock signal CK, which is input, with a prescribed reference and also generates an external synchronous signal SYN in synchronization with a rise of binary clock signal DCK. In this case, external synchronous signal SYN includes 512 pulses in one cycle of binary clock signal DCK.

Figure 8:
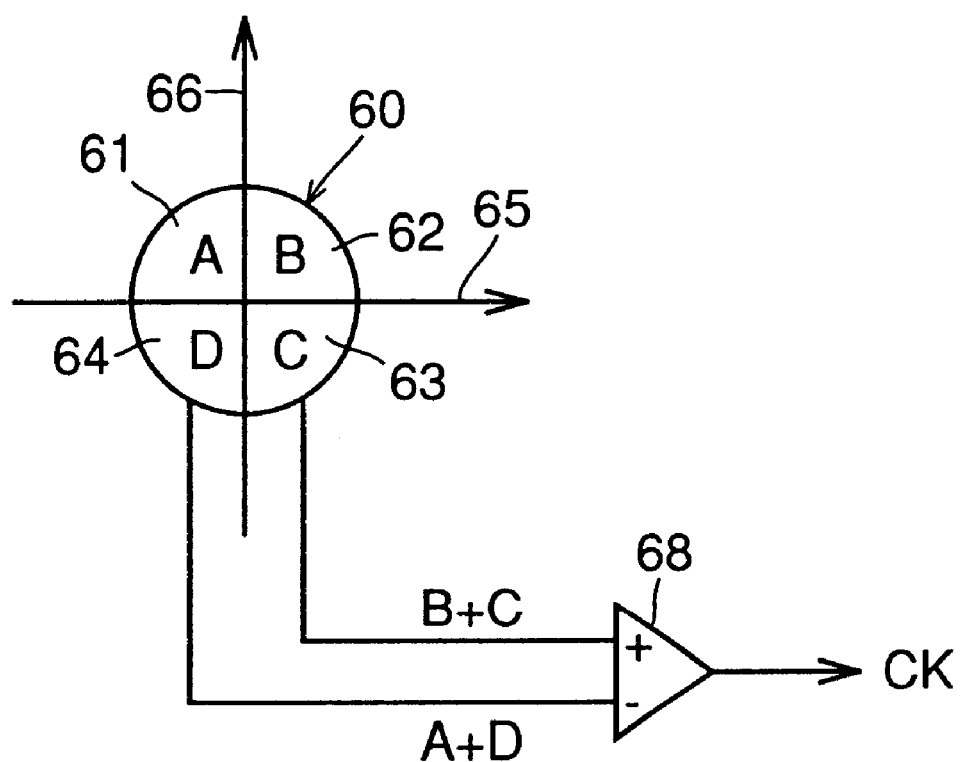
FIG. 8 is a diagram showing another example of the photo-detection portion included in the optical head in FIG. 4.

In the foregoing, discontinuous regions 55 provided in groove 53 are detected by calculating the sum of the intensities of the reflected beam detected in four regions 61–64 of photo detector 60 in optical head 40. However, the detection method is not limited to this but the methods illustrated in FIGS. 8 and 9 may also be used. That is, the method of calculating the difference [[B+C]–[A+D]] as shown in FIG. 8 may be used in which [B+C] is the sum of the intensity [B] of the reflected beam detected in region 62, of four regions 61 to 64 of photodetector 60, and the intensity [C] of the reflected beam detected in region 63 and [A+D] is the sum of the intensity [A] of the reflected beam detected in region 61 and the intensity [D] of the reflected beam detected in region 64. In this case, the signal of the sum [B+C] is input to one terminal of subtractor 68, the signal of the sum [A+D] is input to the other terminal of subtractor 68, and the difference [[B+C]–[A+D]] is output as reproduced signal CK from subtractor 68. The method of calculating the difference between the sum [B+C] of the intensity [B] of the reflected beam detected in region 62 and the intensity [C] of the reflected beam detected in region 63 and the sum [A+D] of the intensity [A] of the reflected beam detected in region 61 and the intensity [D] of the reflected beam detected in region 64 as shown in FIG. 8 can better remove the influence, for example, of noises in magneto-optical recording medium 1 and detect the location of discontinuous regions 55 more correctly. Clock signal CK from subtractor 68 is amplified in reproduced signal amplifying circuit 41 before it is sent to external synchronous signal generating circuit 46.

Figure 9:
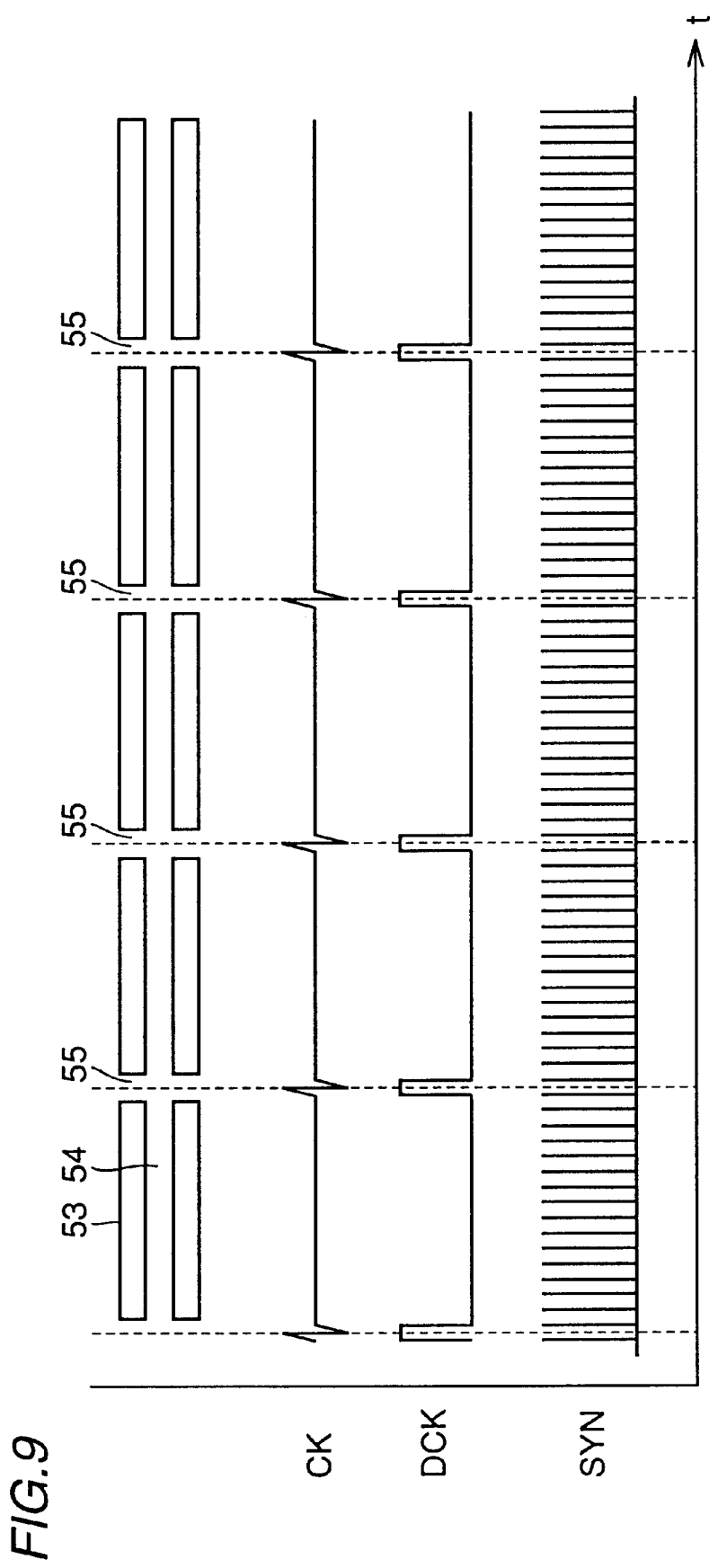
FIG. 9 is a timing chart showing an operation of the external synchronous signal generating circuit in FIG. 4 when the photo-detection portion shown in FIG. 8 is used.

Referring to FIG. 9, external synchronous signal generating circuit 46 generates binary clock signal DCK by comparing clock signal CK, which is sent, with a prescribed reference and also generates external synchronous signal SYN in synchronization with a rise of binary clock signal DCK. Even in this case, external synchronous signal SYN includes 512 pulses in one cycle of binary clock signal DCK similarly to FIG. 7.

Figure 10:
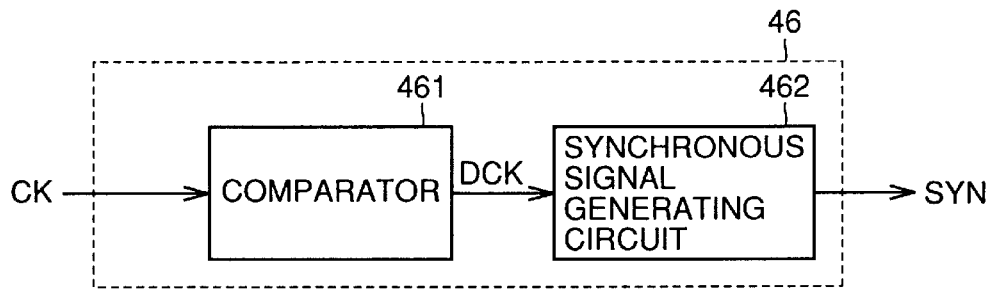
FIG. 10 is a block diagram showing a configuration of the external synchronous signal generating circuit in FIG. 4.

Referring to FIG. 10, a configuration and operation of external synchronous signal generating circuit 46 will be described. External synchronous signal generating circuit 46 includes a comparator 461 for comparing clock signal CK, which is input, with a prescribed reference and generating binary clock signal DCK, and a synchronous signal generating circuit 462 for generating external synchronous signal SYN in synchronization with a rise of binary clock signal DCK from comparator 461. Clock signal CK shown in FIG. 7 or 9 is binarized by a prescribed reference in comparator 461, and binary clock signal DCK is sent to synchronous signal generating circuit 462. In synchronous signal generating circuit 462, external synchronous signal SYN is generated in synchronization with a rise of input binary clock signal DCK.

Timing of Magnetic Field Application and Laser Beam Irradiation

Figure 11:
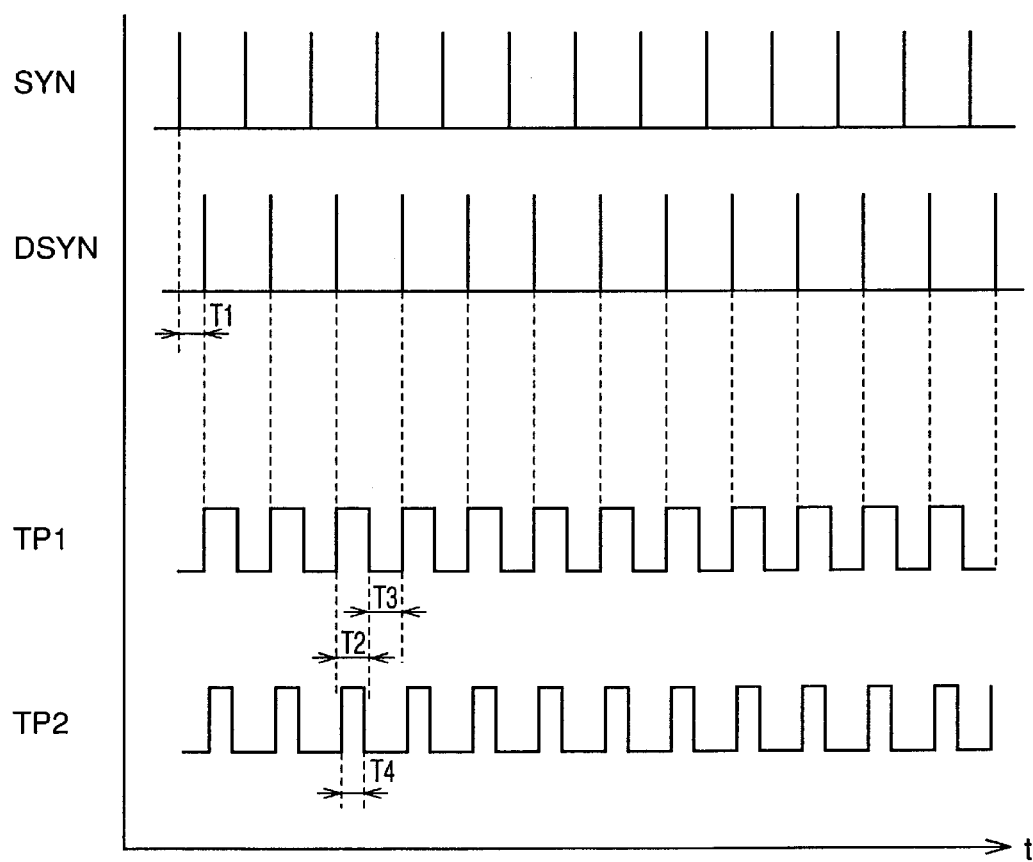
FIG. 11 is a timing chart showing operations of the external synchronous signal generating circuit, the delay circuit and the timing pulse generating circuit in FIG. 4.

Referring to FIG. 11, signals DSYN, TP1 and TP2 generated by delay circuit 47 and timing pulse generating circuit 48 in FIG. 4 will be described. External synchronous signal SYN generated by external synchronous signal generating circuit 46 is sent to delay circuit 47, which generates delayed synchronous signal DSYN delayed by prescribed time T1 from external synchronous signal SYN and sends delayed synchronous signal DSYN to timing pulse generating circuit 48. Delayed external synchronous signal DSYN that is delayed by prescribed time T1 from external synchronous signal SYN is generated in delay circuit 47 to correctly apply an alternating magnetic field and direct a laser beam to a location where the signal of magneto-optical recording medium 1 is recorded, as described below. In synchronization with delayed external synchronous signal DSYN which is sent, timing pulse generating circuit 48 generates timing pulse TP1 for magnetic head 52 to apply an alternating magnetic field to magneto-optical recording medium 1 and timing pulse TP2 for a semiconductor laser in optical head 40 to irradiate magneto-optical recording medium 1 with a pulsed laser beam. In this case, timing pulse generating circuit 48 sets, in timing pulse TP1, to a prescribed ratio, the time T2 during which a magnetic field for magnifying a magnetic domain transferred to reproducing layer 4 of magneto-optical recording medium 1 is applied and the time T3 during which a magnetic field for erasing the magnified magnetic domain is applied. Usually, the ratio T2/T3 is set in a range of 0.2–1.5. Timing pulse generating circuit 48 sets the time T4 and generates timing pulse TP2 so that a magnetic field for magnifying a magnetic domain transferred to reproducing layer 4 of magneto-optical recording medium 1 is applied before a laser beam is directed and that laser beam irradiation is ended before the end of magnetic field application for magnifying the magnetic domain. This is because the magnetic domain transferred to the reproducing layer of magneto-optical recording medium 1 is not magnified sufficiently to obtain a proper reproduced signal even if a laser beam is directed in a transition period when the alternating magnetic field switches from one direction to the other.

Detection of Reproduced Signal

Figure 12:
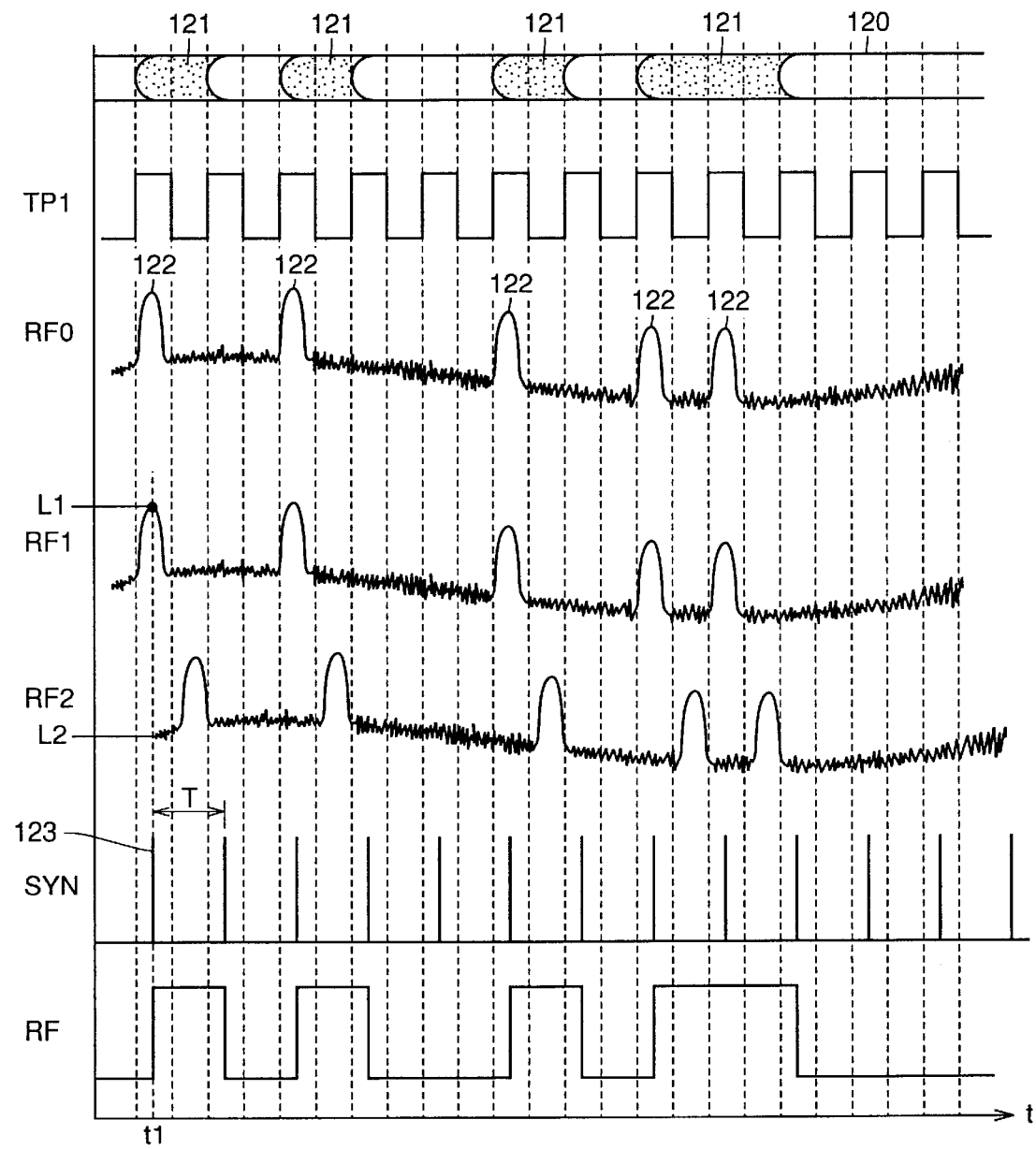
FIG. 12 is a timing chart showing an operation of the reproduced signal detecting circuit in FIG. 4.

Referring to FIG. 12, detection of the reproduced signal in reproduced signal detecting circuit 45 will be described. An alternating magnetic field is applied based on timing pulse TP1 that corresponds to the location of a domain 121 recorded on the groove or land of magneto-optical recording medium 1, and reproduced signal RF0 is detected by the photodetector in optical head 40. Reproduced signal RF0 has a peak 122 correspondingly to magnetic domain magnification. Detected reproduced signal RF0 is amplified in reproduced signal amplifying circuit 41 before it is input to reproduced signal detecting circuit 45. Reproduced signal detecting circuit 45 generates a digital reproduced signal RF1 by A/D converting analog reproduced signal RF0 which is input and also generates a reproduced signal RF2 which is delayed from reproduced signal RF1 by a half cycle (T/2) of external synchronous signal SYN. In synchronization with external synchronous signal SYN, reproduced signal detecting circuit 45 subtracts reproduced signal RF2 from reproduced signal RF1 to generate a binary reproduced signal RF. Since reproduced signal RF1 is a signal corresponding to the magnetic domain magnified by the alternating magnetic field and reproduced signal RF2 is a signal delayed from reproduced signal RF1 by a half cycle of external synchronous signal SYN, such subtraction corresponds to differential calculation of the reproduced signal at time of magnetic domain erasure from the reproduced signal at the time of magnetic domain magnification.

Specifically, at time t1, reproduced signal RF1 has a peak level L1 at the time of magnetic domain magnification and reproduced signal RF2 has a level L2 at the time of magnetic domain erasure. Accordingly, subtraction of reproduced signal RF2 from reproduced signal RF1 at time t1 results in the difference [L1−L2] between peak levels L1 and L2. In other words, the difference [L1−L2] corresponds to the level difference between the reproduced signal generated at the time of magnetic domain magnification and the reproduced signal generated at the time of magnetic domain erasure.

As a result, reproduced signal RF generated as described above does not include low frequency "winding" due to double refraction or tilt of a substrate of magneto-optical recording medium 1. As described above, in the magneto-optical disk recording/reproducing apparatus according to this embodiment, reproduced signal RF is detected by subtracting the reproduced signal intensity when a magnetic domain in reproducing layer 4 is erased from the reproduced signal intensity when a magnetic domain is transferred to reproducing layer 4 of magneto-optical recording medium 1 and magnified, and therefore correct reproduced signal RF without "winding" can be obtained.

First Implementation of Reproduced Signal Detecting Circuit

Figure 13:
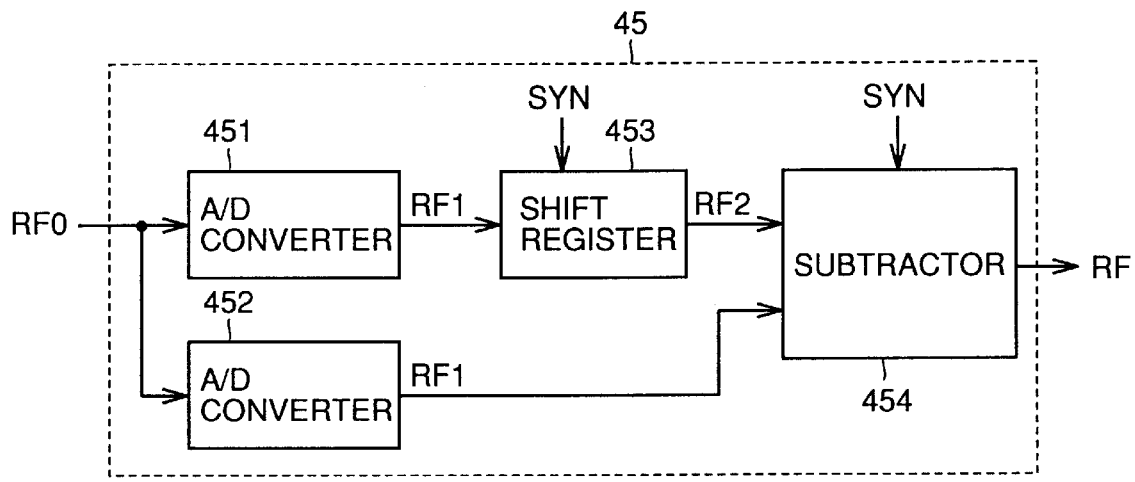
FIG. 13 is a block diagram showing a first implementation of the reproduced signal detecting circuit in FIG. 4.

Referring to FIG. 13, a first implementation of reproduced signal detecting circuit 45 will be described. Reproduced signal detecting circuit 45 includes an A/D converter 451 for converting analog reproduced signal RF0 from optical head 40 to digital reproduced signal RF1, an A/D converter 452 for similarly converting analog reproduced signal RF0 to digital reproduced signal RF1, a shift register 453 for delaying digital reproduced signal RF1 from A/D converter 451 by a half cycle (T/2) of external synchronous signal SYN in response to external synchronous signal SYN from external synchronous signal generating circuit 46, and a subtractor 454 for detecting, as binary reproduced signal RF, a difference between digital reproduced signal RF1 from A/D converter 452 and delayed digital reproduced signal RF2 from shift register 453.

Analog reproduced signal RF0 is input to A/D converters 451 and 452 and converted to digital reproduced signal RF1. Digital reproduced signal RF1 from A/D converter 451 is input to shift register 453 and delayed by a half cycle (T/2) of external synchronous signal SYN. Reproduced signal RF1 from A/D converter 452 and delayed reproduced signal RF2 from shift register 453 are input to subtractor 454, and reproduced signal RF2 is subtracted from reproduced signal RF1 in synchronization with external synchronous signal SYN. Thus, binary reproduced signal RF is generated.

Second Implementation of Reproduced Signal Detecting Circuit

Figure 14:
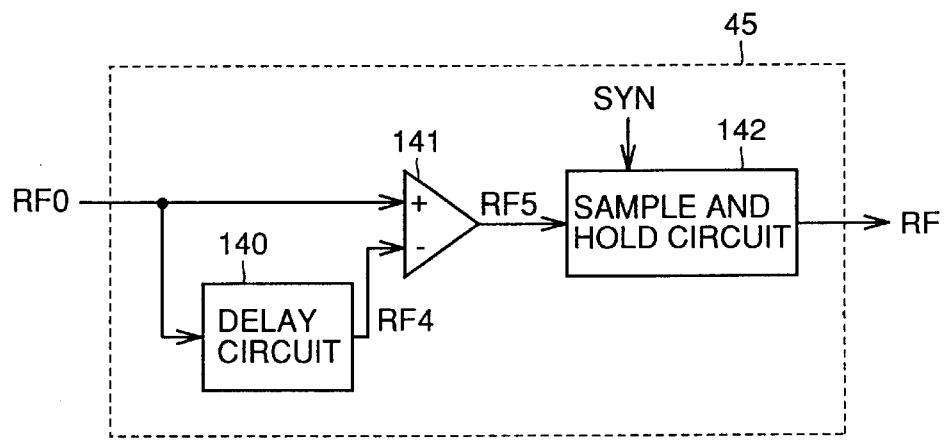
FIG. 14 is a block diagram showing a second implementation of the reproduced signal detecting circuit in FIG. 4.
Figure 15:
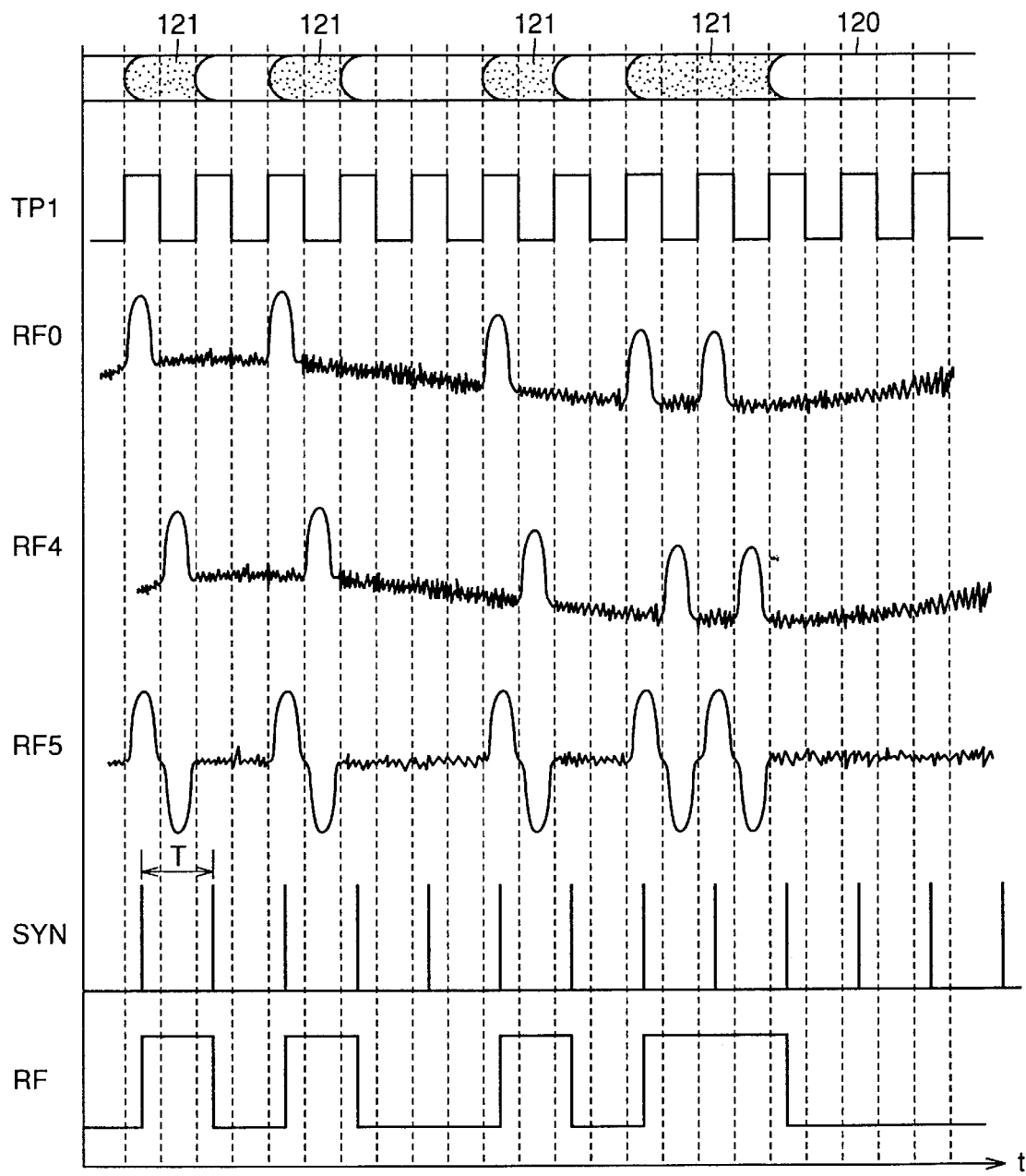
FIG. 15 is a timing chart showing an operation of the reproduced signal detecting circuit shown in FIG. 14.

Referring to FIGS. 14 and 15, a second implementation of reproduced signal detecting circuit 45 will be described. Reproduced signal detecting circuit 45 includes a delay circuit 140 for delaying reproduced signal RF0 from optical head 40 by a half cycle (T/2) of external synchronous signal SYN in response to external synchronous signal SYN from external synchronous signal generating circuit 46, a subtractor (differential amplifier) 141 for calculating a difference between reproduced signal RF0 from optical head 40 and a delayed reproduced signal RF4 from delay circuit 140, and a sample and hold circuit 142 for sampling and holding a reproduced signal RF5 from subtractor 141 in synchronization with external synchronous signal SYN. Since external synchronous signal SYN rises while timing pulse TP1 is at the high level, sample and hold circuit 142 holds reproduced signal RF5 when a magnetic domain is magnified by magnetic field application from magnetic head 52.

Reproduced signal RF0 is input to delay circuit 140 and the non-inverted input terminal (+) of subtractor 141. Reproduced signal RF0 is delayed by a half cycle (T/2) of external synchronous signal SYN by delay circuit 140, and delayed reproduced signal RF4 is input to the inverted input terminal (−) of subtractor 141. Subtractor 141 subtracts reproduced signal RF4 from reproduced signal RF0, and the difference is input as reproduced signal RF5 to sample and hold circuit 142. Reproduced signal RF5 is held in synchronization with external synchronous signal SYN, and thus binary reproduced signal RF is generated. More specifically, the level of reproduced signal RF5 at the time of a rise of synchronous signal SYN is sampled and held.

Even if the configuration as shown in FIG. 14 is adopted as reproduced signal detecting circuit 45, a correct reproduced signal RF without "winding" can be obtained by subtracting a reproduced signal generated at the time of magnetic domain erasure from a reproduced signal generated at the time of magnetic domain magnification.

Third Implementation of Reproduced Signal Detecting Circuit

Figure 16:
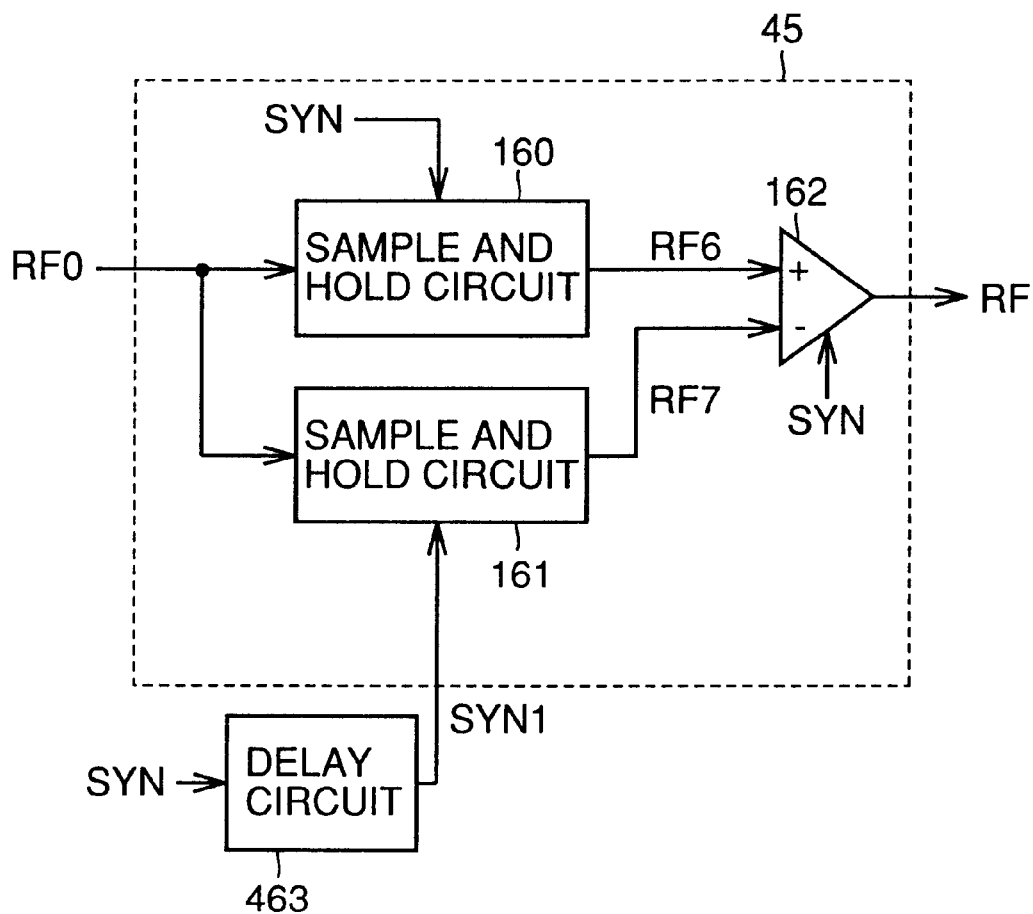
FIG. 16 is a block diagram showing a third implementation of the reproduced signal detecting circuit in FIG. 4.
Figure 17:
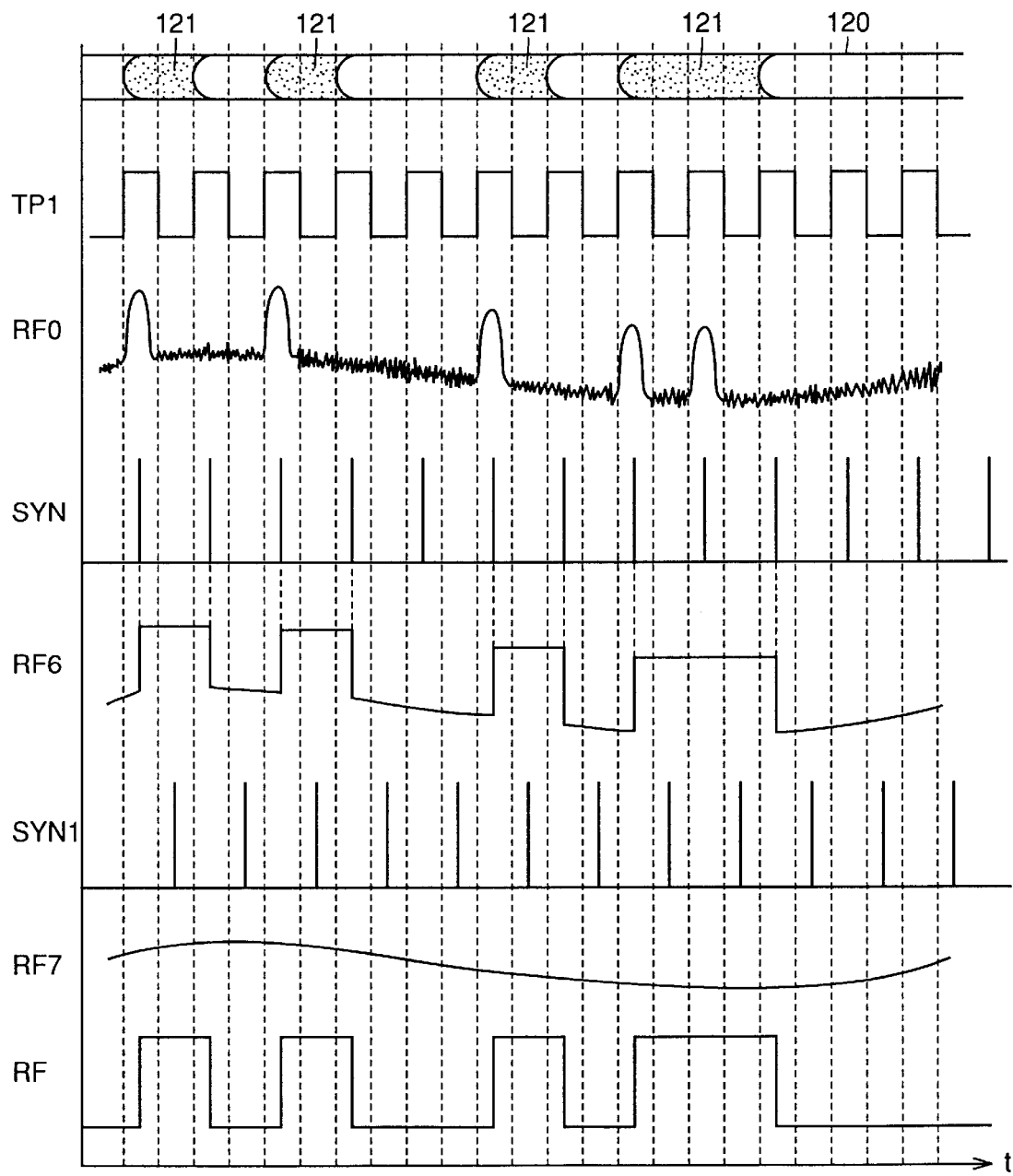
FIG. 17 is a timing chart showing an operation of the reproduced signal detecting circuit shown in FIG. 16.

Referring to FIGS. 16 and 17, a third implementation of reproduced signal detecting circuit 45 will be described. Reproduced signal detecting circuit 45 includes a sample and hold circuit 160 for sampling and holding reproduced signal RF0 from optical head 40 in response to synchronous signal SYN from synchronous signal generating circuit 46, a sample and hold circuit 161 for sampling and holding reproduced signal RF0 from optical head 40 in response to delayed external synchronous signal SYN1 from delay circuit 463, and a subtractor (differential amplifier) 162 for calculating a difference between reproduced signal RF6 from sample and hold circuit 160 and a reproduced signal RF7 from sample and hold circuit 161. Here, external synchronous signal SYN1 delayed by a half cycle (T/2) by delay circuit 463 is input to sample and hold circuit 161.

Reproduced signal RF0 is input to sample and hold circuits 160 and 161. Sample and hold circuit 160 holds the level of reproduced signal RF0 in synchronization with external synchronous signal SYN, and sample and hold circuit 161 holds the level of reproduced signal RF0 in synchronization with external synchronous signal SYN1. Reproduced signal RF6 from sample and hold circuit 160 is input to the non-inverted input terminal (+) of subtractor 162, and reproduced signal RF7 from sample and hold circuit 161 is input to the inverted input terminal (−) of subtractor 162. Subtractor 162 subtracts reproduced signal RF7 from reproduced signal RF6 and thus binary reproduced signal RF is obtained. Here, subtractor 162 preferably operates in synchronization with external synchronous signal SYN.

Even if the configuration as shown in FIG. 16 is adopted as reproduced signal detecting circuit 45, correct reproduced signal RF without "winding" can be obtained by subtracting a reproduced signal at the time of magnetic domain erasure from a reproduced signal at the time of magnetic domain magnification.

Fourth Implementation of Reproduced Signal Detecting Circuit

Figure 18:
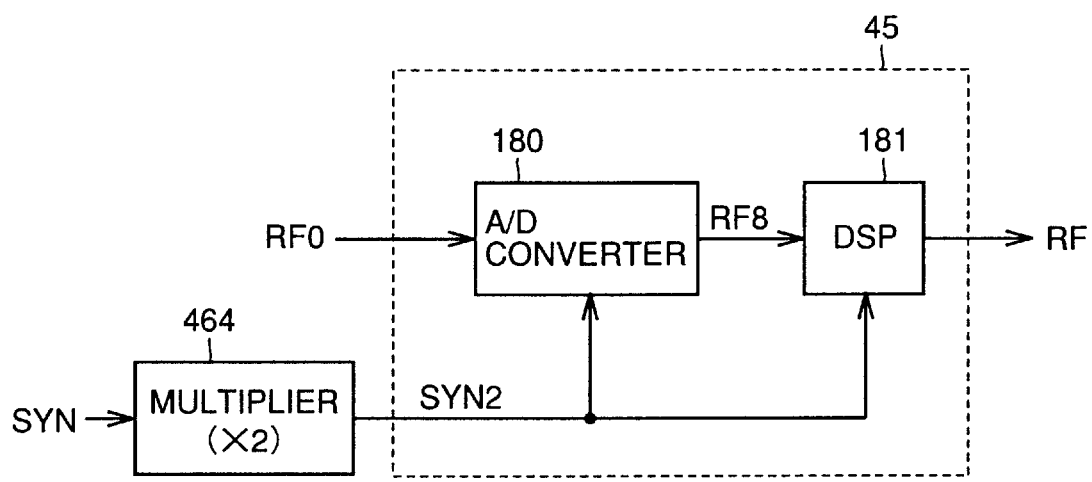
FIG. 18 is a block diagram showing a fourth implementation of the reproduced signal detecting circuit in FIG. 4.
Figure 19:
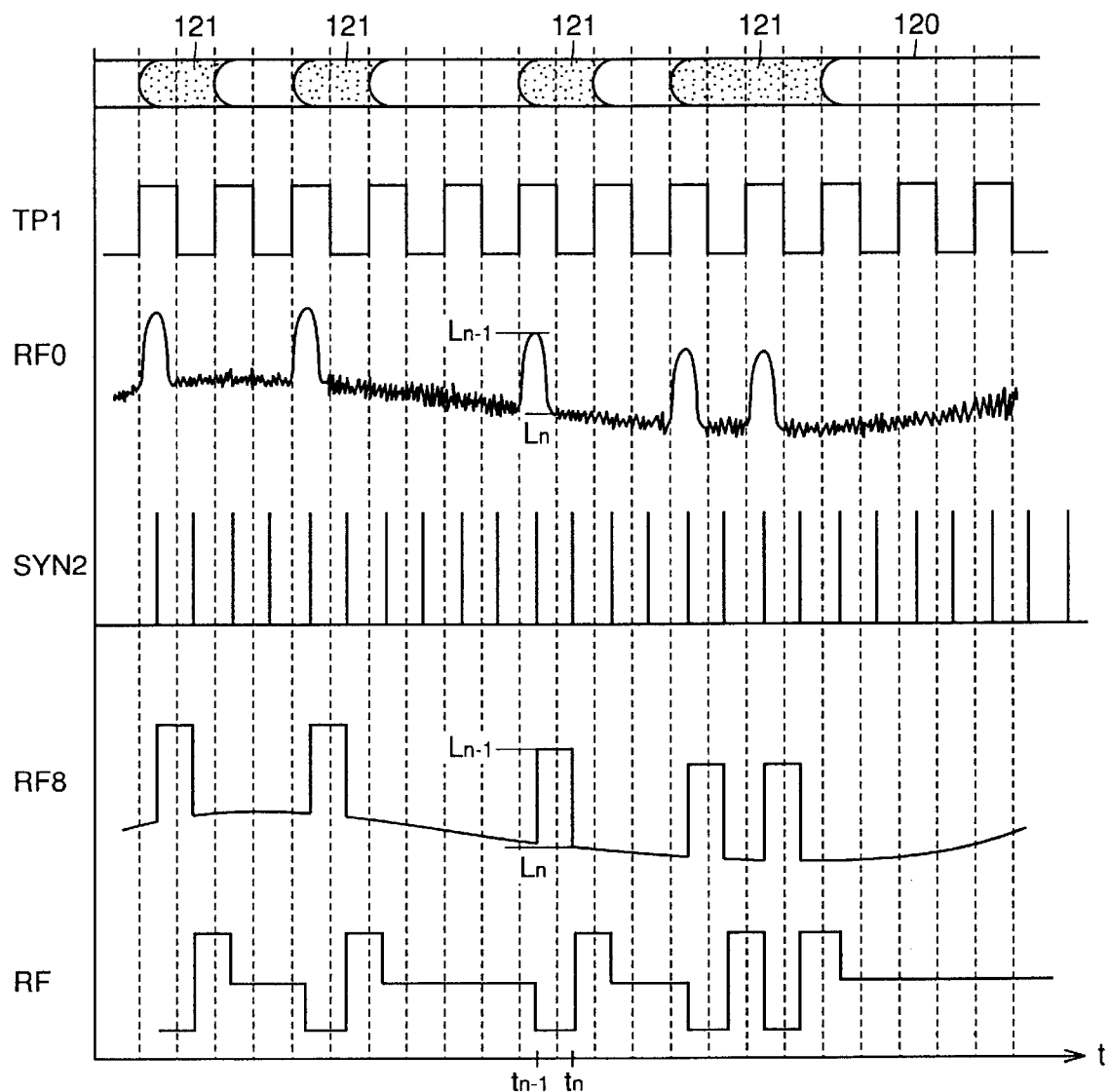
FIG. 19 is a timing chart showing an operation of the reproduced signal detecting circuit shown in FIG. 18.

Referring to FIGS. 18 and 19, a fourth implementation of reproduced signal detecting circuit 45 will be described. Reproduced signal detecting circuit 45 includes an A/D converter 180 for converting analog reproduced signal RF0 from optical head 40 to a digital reproduced signal RF8, and a DSP (digital signal processor) 181 for calculating a difference between digital reproduced signal RF8, from A/D converter 180, generated at the time of magnetic domain magnification and digital reproduced signal RF8 generated at the time of magnetic domain erasure. An external synchronous signal SYN2 generated by a multiplier 464 and having a frequency twice as high as external synchronous signal SYN is input to A/D converter 180 and DSP 181. A/D converter 180 carries out A/D conversion in response to external synchronous signal SYN2. DSP181 also calculates the difference in response to external synchronous signal SYN2.

Analog reproduced signal RF0 is input to A/D converter 180, and the level of reproduced signal RF0 at the time of a rise of external synchronous signal SYN2 is subjected to A/D conversion. Accordingly, the level $L_{n-1}$ of reproduced signal RF0 at time $t_{n-1}$ when external synchronous signal SYN2 rises is subjected to A/D conversion, and the level $L_n$ of reproduced signal RF0 at time $t_n$ when external synchronous signal SYN2 rises again is subjected to A/D conversion. Thus, digital reproduced signal RF8 is generated. Digital reproduced signal RF8 is input to DSP181, and the level $L_n$ of reproduced signal RF8 at time $t_n$ is subtracted from the level $L_{n-1}$ of reproduced signal RF8 at time $t_{n-1}$.

Thus, reproduced signal RF is generated. Accordingly, DSP181 calculates a difference between digital reproduced signal RF8 from A/D converter 180 at the time of magnetic field application for magnetic domain magnification and digital reproduced signal RF8 from A/D converter 180 at the time of magnetic field application for magnetic domain erasure.

Even if the configuration as shown in FIG. 18 is adopted as reproduced signal detecting circuit 45, correct reproduced signal RF without "winding" can be obtained by subtracting a reproduced signal generated at the time of magnetic domain erasure from a reproduced signal generated at the time of magnetic domain magnification.

Reproduced signal detecting circuit 45 is not limited to the configurations shown in the first to fourth implementations. Any configuration may be adopted if it can subtract a reproduced signal generated at the time of magnetic domain erasure from a reproduced signal generated at the time of magnetic domain magnification.

Other Implementations

Figure 20:
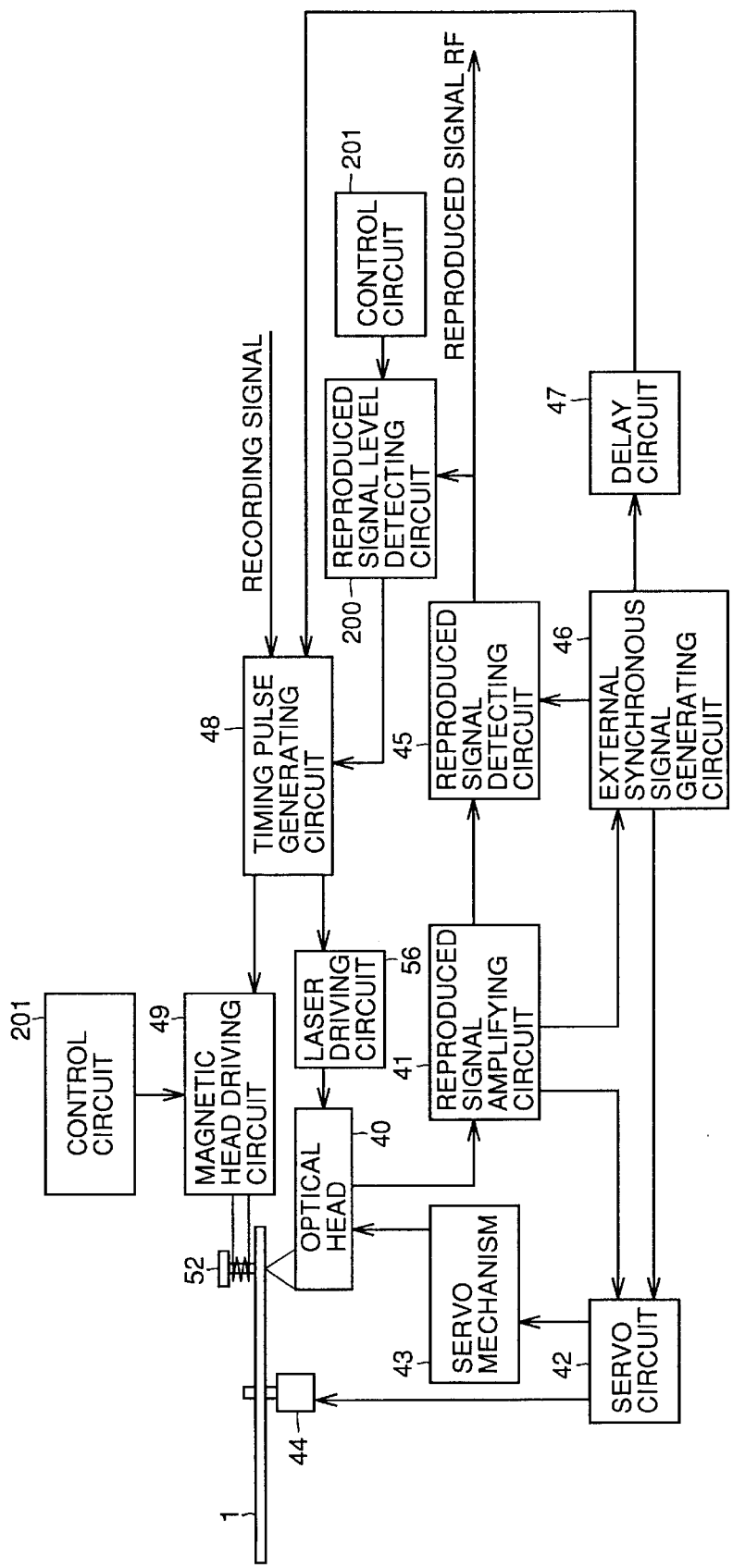
FIG. 20 is a block diagram showing another configuration of the optical disk recording/reproducing apparatus according to the embodiment of the present invention.

The magneto-optical disk recording/reproducing apparatus is not limited to the configuration as shown in FIG. 4. The configuration as shown in FIG. 20 may be adopted. In addition to the configuration of FIG. 4, the magneto-optical disk recording/reproducing apparatus shown in FIG. 20 includes a reproduced signal level detecting circuit 200 and a control circuit 201. The apparatus is characterized in that, after the level of an alternating magnetic field which sufficiently erases a magnetic domain transferred and magnified in reproducing layer 4 of magneto-optical recording medium 1 is detected, timing pulse generating circuit 48 sets the time for erasing the magnetic domain according to the level of the alternating magnetic field to generate timing pulse TP1.

Figure 21:
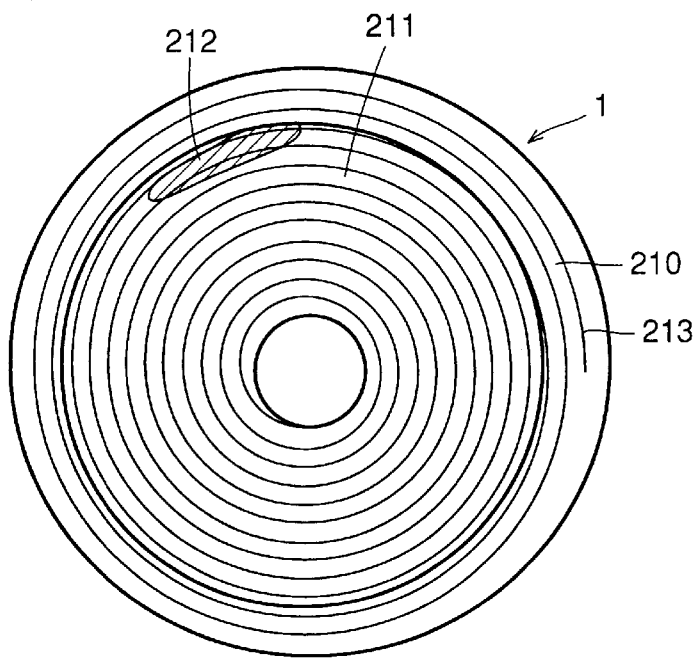
FIG. 21 is a plan view showing a track structure of a magneto-optical recording disk.

The level of an alternating magnetic field by which a magnetic domain is sufficiently erased is determined in a test region provided in magneto-optical recording medium 1. Referring to FIG. 21, a plan configuration of magneto-optical recording medium 1 will be described. Magneto-optical recording medium 1 has a spiral track 213 consisting of a land and a groove, a TOC (table of contents) region 210 on the periphery, and a data region 211 inside. Since track 213 advances from the outer circumference to the inner circumference in magneto-optical recording medium 1, a test region 212 is provided at the beginning of data region 211 after the end of TOC region 210.

Figure 22:
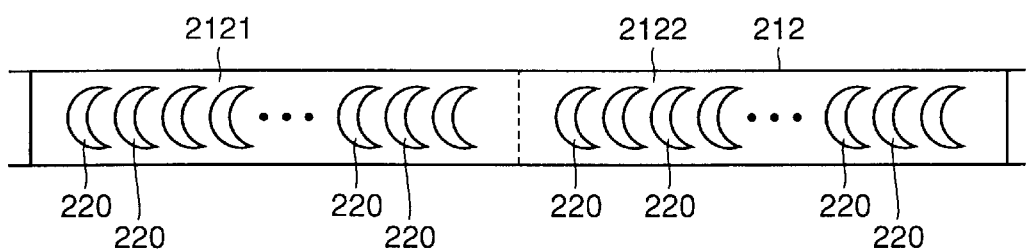
FIG. 22 is a diagram showing a configuration of a test region in the magneto-optical disk shown in FIG. 21.

Referring to FIG. 22, test region 212 will be described in detail. Test region 212 is formed of first and second test regions 2121 and 2122 on which a plurality of shortest domains 220 are predecoded at prescribed intervals. First test region 2121 determines the intensity of a laser beam in such a degree that does not transfer a magnetic domain from recording layer 6 to reproducing layer 4 in magneto-optical recording medium 1, and second test region 2122 determines the intensity of an alternating magnetic field that is sufficient to erase a transferred and magnified magnetic domain in reproducing layer 4.

Figure 23:
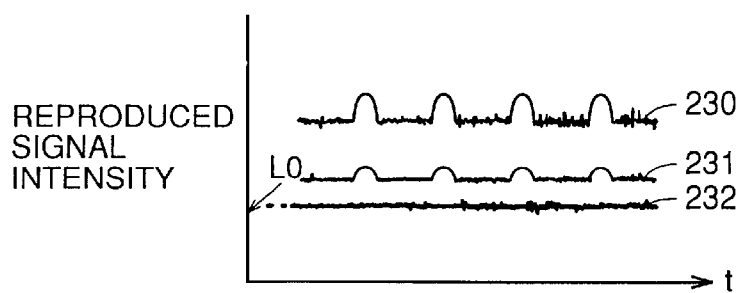
FIG. 23 is a waveform chart showing a reproduced signal detected when only a laser beam is directed.

Referring to FIG. 23, determination of the intensity of a laser beam in such a degree that does not transfer a magnetic domain from recording layer 6 to reproducing layer 4 will be described. First test region 2121 is irradiated with a laser beam while changing its intensity to detect a reproduced signal. The reproduced signal is detected by the method described above. When the intensity of a laser beam is high, a signal 230 or 231 with peaks is detected. When the intensity of a laser beam is low, however, a signal 232 without any peaks is detected. In this case, the presence of peaks in a detected signal means that a magnetic domain has been transferred to reproducing layer 4, and the absence of peaks in a detected signal means that a magnetic domain has not been transferred to reproducing layer 4. Accordingly, the intensity when signal 232 is detected is determined as the optimal intensity of a laser beam.

Figure 24:
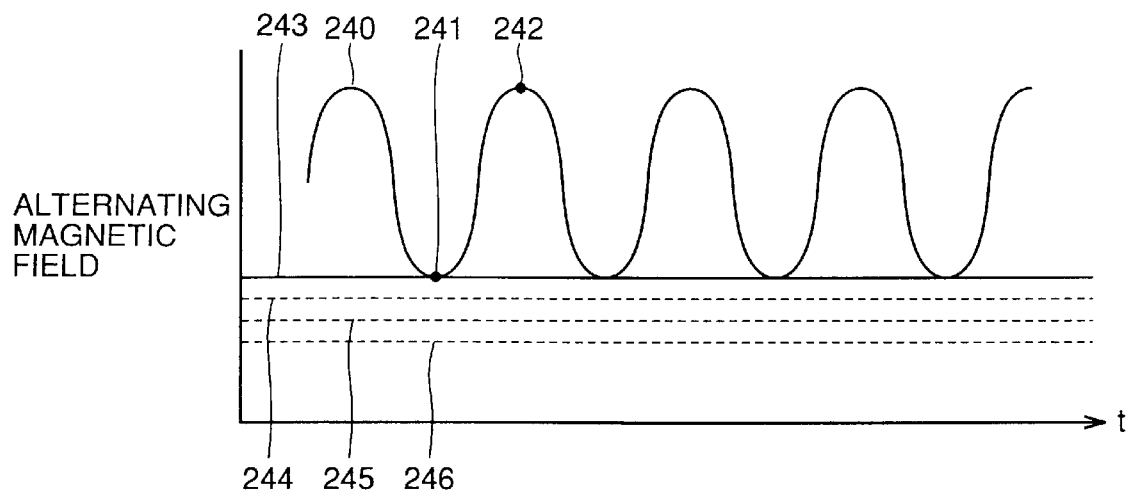
FIG. 24 is a waveform chart showing an alternating magnetic field applied from a magnetic head.

After determination of the intensity of a laser beam in such a degree that does not transfer a magnetic domain to reproducing layer 4, the intensity of an alternating magnetic field sufficient to erase a transferred and magnified magnetic domain in reproducing layer 4 is determined in second test region 2122. Referring to FIG. 24, an alternating magnetic field to be applied in second test region 2122 will be described. An alternating magnetic field 240 has the maximum value 242 and the minimum value 241 and changes in a prescribed cycle. A magnetic domain is transferred and magnified in reproducing layer 4 at the timing of application of a magnetic field at maximum value 242, and the transferred and magnified magnetic domain is erased at the timing of application of a magnetic field at minimum value 241. In second test region 2122, therefore, a reproduced signal is detected by applying the alternating magnetic field with a varying level of minimum value 241. That is, the level of alternating magnetic field 240 to be applied is changed from the levels 243 to 246.

Figure 25:
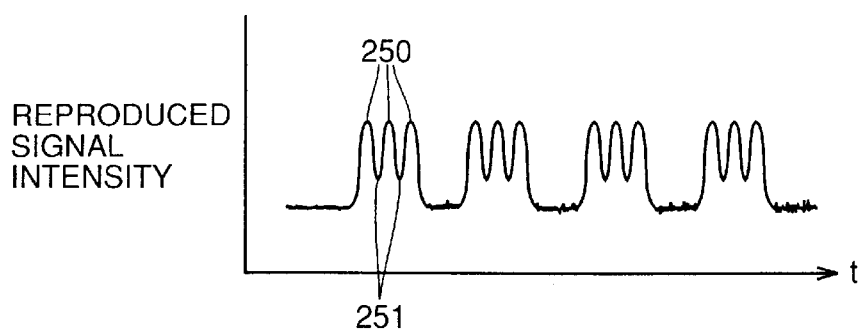
FIG. 25 is a waveform chart showing a reproduced signal detected by the magnetic domain magnification method.
Figure 26:
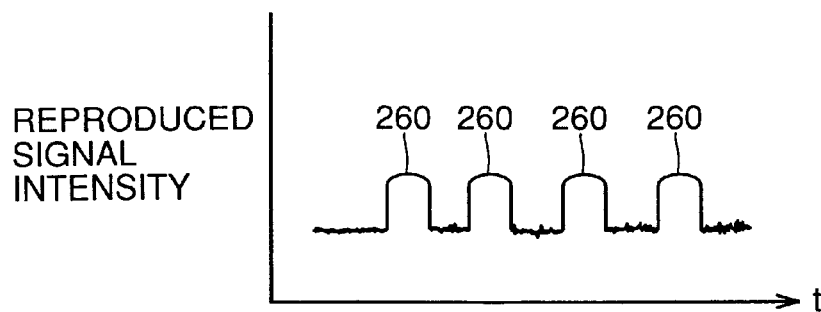
FIG. 26 is a waveform chart showing a reproduced signal detected from an unerased magnetic domain by directing only a laser beam without applying a magnetic field.
Figure 27:
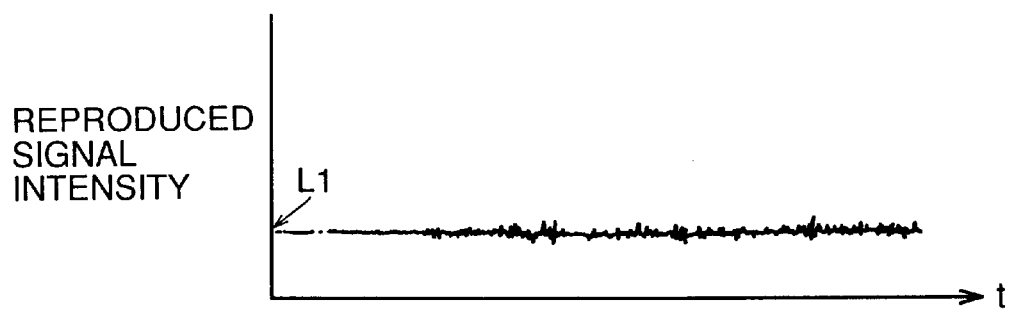
FIG. 27 is a waveform chart showing a reproduced signal detected from an erased magnetic domain by applying a magnetic field and directing a laser beam.
Figure 28:
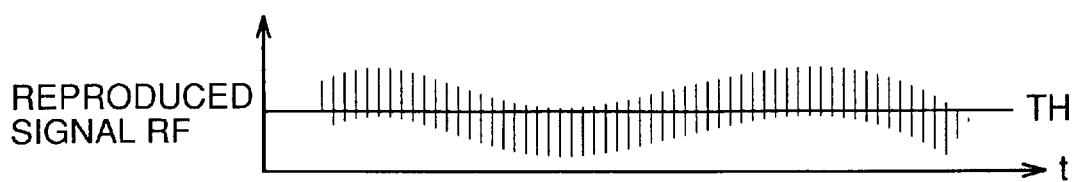
FIG. 28 is a waveform chart showing an analog reproduced signal detected from a magneto-optical recording medium.

Referring to FIG. 25, when a reproduced signal is detected by applying a laser beam and an alternating magnetic field, maximum value 250 occurs in the reproduced signal correspondingly to the timing at which a magnetic field at maximum value 242 of alternating magnetic field 240 is applied, and minimum value 251 occurs in the reproduced signal correspondingly to the timing at which a magnetic field at minimum value 241 of alternating magnetic field 240 is applied. After the reproduced signal is detected by applying a laser beam and an alternating magnetic field, a signal is detected in second test region 2122 by directing only a laser beam with the intensity not transferring a magnetic domain to reproducing layer 4. In this case, an alternating magnetic field for erasure is insufficient, that is, minimum value 241 of alternating magnetic field 240 is insufficient, and therefore a signal with peaks 260 as shown in FIG. 26 is detected when a transferred and magnified magnetic domain remains in reproducing layer 4. If an alternating magnetic field for erasure is sufficient, a signal without any peaks as shown in FIG. 27 is detected. Accordingly, an alternating magnetic field that has the level of minimum value 241 when the signal shown in FIG. 27 is detected is determined as an alternating magnetic field for reproduction.

Here, the time for applying a magnetic field, of an alternating magnetic field, used for magnetic domain erasure is determined according to the level of minimum value 241 of the determined alternating magnetic field. In other words, the time for applying a magnetic field used for magnetic domain erasure is set to be short when minimum value 241 has level 243 and is set to be long when minimum value 241 has level 246.

In second test region 2122 of test region 212, control circuit 201 shown in FIG. 20 controls magnetic head control circuit 49 to apply, to magneto-optical recording medium 1, an alternating magnetic field having varying minimum value 241, that is, having minimum value 241 at levels 243, 244, 245 and 246. A reproduced signal detected by applying a laser beam and an alternating magnetic field in second test region 2122 as well as a reproduced signal detected by directing only a laser beam thereafter are amplified in reproduced signal amplifying circuit 41 and detected in reproduced signal detecting circuit 45 by the method described above. Of these signals, the reproduced signal detected by directing only a laser beam is sent to reproduced signal level detecting circuit 200 which detects the existence of peaks in the sent reproduced signal. Reproduced signal level detecting circuit 200 has been supplied with information on levels 243 to 246 for minimum value 241 of the alternating magnetic field from control circuit 201. Accordingly, reproduced signal level detecting circuit 200 can determine the level of minimum value 241 of an alternating magnetic field when there is not any peaks in the sent reproduced signal, and sends the determined level to timing pulse generating circuit 48. Timing pulse generating circuit 48 generates timing pulse TP1 by setting the time for applying a magnetic field used for magnetic domain erasure according to the level of sent minimum value 241. The subsequent operation is the same as FIG. 4 above.

As described above, test region 212 is provided only at one portion. However, the number of test regions is not limited to one but a plurality of test regions may be provided.

In the magneto-optical disk recording/reproducing apparatus shown in FIG. 20, an alternating magnetic field sufficient to erase a transferred and magnified magnetic domain in reproducing layer 4 of magneto-optical recording medium 1 is determined and, thereafter, timing pulse TP1 for applying an alternating magnetic field used for reproducing a recorded signal is determined. Therefore, the reproduced signal can be detected while the transferred and magnified magnetic domain is completely erased, and a more correct reproduced signal can be detected by the synergistic effect with the method of detecting a reproduced signal described above.

It is to be understood that the embodiment described herein is illustrative and not limiting in any sense. The scope of the present invention is limited not by the description above but by the claims for patent and is intended to include all modifications in the sense and scope equivalent to the claims for patent.

INDUSTRIAL APPLICABILITY

As described above, the present invention can be applied to magneto-optical disk recording/reproducing apparatuses for restoring a signal from a magneto-optical disk and more particularly to a magneto-optical disk recording/reproducing apparatus for reproducing a signal by transferring and magnifying a magnetic field from a recording layer to a reproducing layer of a magneto-optical recording medium.

What is claimed is:

1. An information reproducing apparatus for reproducing information from a magneto-optical recording medium (1), comprising:

a magnetic head (52) provided to alternately apply, to each of domains recorded on said magneto-optical recording medium (1), a magnetic field (10) in a first direction and a magnetic field (11) in a second direction opposite to said first detection;

an optical head (40) provided to irradiate said magneto-optical recording medium (1) with a laser beam and generate a detected signal (RF0) according to the reflected beam from said magneto-optical recording medium (1); and a reproduced signal detecting circuit (45) provided to detect, as a reproduced signal (RF), a difference between the detected signal (RF0) from said optical head (40) when said magnetic field (10) in the first direction is applied and the detected signal (RF0) from said optical head (40) when said magnetic field (11) in the second direction is applied.

2. The information reproducing apparatus according to claim 1, wherein said reproduced signal detecting circuit (45) includes a delay circuit (453, 140) provided to delay the detected signal (RF0) from said optical head (40), and a differential circuit (454, 141) provided to detect said difference based on the detected signal (RF0) from said optical head (40) and the delayed detected signal (RF2, RF4) from said delay circuit (453, 140).

3. The information reproducing apparatus according to claim 1, wherein said reproduced signal detecting circuit (45) includes a first A/D converter (451) provided to convert an analog detected signal (RF0) from said optical head (40) to a digital detected signal (RF1), a second A/D converter (452) provided to convert an analog detected signal (RF0) from said optical head (40) to a digital detected signal (RF1), a shift register (453) provided to delay the digital detected signal (RF1) from said first A/D converter (451), and a subtractor (454) provided to calculate said difference based on the digital detected signal (RF1) from said second A/D converter (452) and the delayed digital detected signal (RF2) from said shift register.

4. The information reproducing apparatus according to claim 3, further comprising:

a synchronous signal generating circuit (46) provided to generate a synchronous signal (SYN) based on a detected signal (CK) from said optical head (40), wherein said shift register (453) delays said digital detected signal (RF1) by a half cycle (T/2) of said synchronous signal (SYN) in response to the synchronous signal (SYN) from said synchronous signal generating circuit (46).

5. The information reproducing apparatus according to claim 1, wherein said reproduced signal detecting circuit (45) includes a first delay circuit (140) provided to delay the detected signal (RF0) from said optical head (40), a differential amplifier (141) provided to calculate said difference based on the detected signal (RF0) from said optical head (40) and the delayed detected signal (RF4) from said first delay circuit (140), and a sample and hold circuit (142) provided to sample and hold an output signal (RF5) from said differential amplifier (141) when said magnetic field (10) in the first direction is applied.

6. The information reproducing apparatus according to claim 5, further comprising:

a synchronous signal generating circuit (46) provided to generate a synchronous signal (SYN) based on a detected signal (CK) from said optical head (40), wherein said sample and hold circuit (142) samples and holds the output signal (RF5) from said differential amplifier (141) in response to said synchronous signal (SYN).

7. The information reproducing apparatus according to claim 1, wherein said reproduced signal detecting circuit (45) includes a first sample and hold circuit (160) provided to sample and hold the detected signal (RF0) from said optical head (40) when said magnetic field in the first direction (10) is applied, a second sample and hold circuit (161) provided to sample and hold the detected signal (RF0) from said optical head (40) when said magnetic field (11) in the second direction is applied, and a differential amplifier (162) provided to calculate said difference based on a detected signal (RF6) from said first sample and hold circuit (160) and a detected signal (RF7) from said second sample and hold circuit (161).

8. The information reproducing apparatus according to claim 7, further comprising:

a synchronous signal generating circuit (46) provided to generate a synchronous signal (SYN) based on a detected signal (CK) from said optical head (40); and a delay circuit (463) provided to delay the synchronous signal (SYN) from said synchronous signal generating circuit (46) by a half cycle (T/2) of the synchronous signal, wherein said first sample and hold circuit (160) samples and holds the detected signal (RF0) from said optical head (40) in response to the synchronous signal (SYN) from said synchronous signal generating circuit (46), and said second sample and hold circuit (161) samples and holds the detected signal (RF0) from said optical head (40) in response to the delayed synchronous signal (SYN1) from said delay circuit (463).

9. The information reproducing apparatus according to claim 1, wherein said reproduced signal detecting circuit (45) includes an A/D converter (180) provided to convert an analog detected signal (RF0) from said optical head (40) to a digital detected signal (RF8) when said magnetic field (10) in the first direction is applied and to convert an analog detected signal (RF0) from said optical head (40) to a digital detected signal (RF8) when said magnetic field (11) in the second direction is applied, and a DSP (181) provided to calculate said difference based on the digital detected signal (RF8) from said A/D converter (180) when said magnetic field (10) in the first direction is applied and the digital detected signal (RF8) from said A/D converter (180) when said magnetic field (11) in the second direction is applied.

10. The information reproducing apparatus according to claim 9, further comprising:

a synchronous signal generating circuit (46) provided to generate a first synchronous signal (SYN) based on a detected signal (CK) from said optical head (40); and a multiplier (464) provided to generate a second synchronous signal (SYN2) having a frequency twice as high as said first synchronous signal (SYN) in response to the first synchronous signal (SYN) from said synchronous signal generating circuit (46), wherein said A/D converter (180) converts the analog detected signal (RF0) from said optical head (40) to the digital detected signal (RF8) in response to the second synchronous signal (SYN2) from said multiplier (464).

11. The information reproducing apparatus according to claim 10, wherein said DSP (181) calculates said difference in response to the second synchronous signal (SYN2) from said multiplier (464).

12. The information reproducing apparatus according to claim 1, wherein said magnetic head (52) applies said magnetic field (10) in the first direction to magnify a magnetic domain (31) transferred to a reproducing layer (4) of said magneto-optical recording medium (1), and applies said magnetic field (11) in the second direction to erase said magnified magnetic domain (31).

13. The information reproducing apparatus according to claim 1, further comprising:

a synchronous signal generating circuit (46) provided to generate a synchronous signal (SYN) based on a detected signal (CK) from said optical head (40), wherein said magnetic head (52) applies said magnetic fields (10, 11) in the first and second directions in response to the synchronous signal (SYN) from said synchronous signal generating circuit (46).

14. The information reproducing apparatus according to claim 1, further comprising:

a delay circuit (47) provided to delay the synchronous signal (SYN) from said synchronous signal generating circuit (46);

a timing pulse generating circuit (48) provided to generate a first timing pulse (TP1) for driving said magnetic head (52) and a second timing pulse (TP2) for driving a semiconductor laser in said optical head (40) in response to the delayed synchronous signal (DSYN) from said delay circuit (47);

a magnetic head driving circuit (49) for driving said magnetic head (52) in response to the first timing pulse (TP1) from timing pulse generating circuit (48); and a laser driving circuit (56) for driving the semiconductor laser in said optical head (40) in response to the second timing pulse (TP2) from said timing pulse generating circuit (48).

15. An information reproducing apparatus for reproducing information from a magneto-optical recording medium (1) by magnetic domain magnification, comprising:

an optical head (40) provided to irradiate said magneto-optical recording medium (1) with a laser beam and generate a detected signal (RF0, CK) according to the reflected beam from said magneto-optical recording medium (1);

a synchronous signal generating circuit (46) provided to generate a synchronous signal (SYN) based on the detected signal (CK) from said optical head (40);

a magnetic head (52) provided to apply an alternating magnetic field (10, 11) to each of domains recorded on said magneto-optical recording medium (1) in response to the synchronous signal (SYN) from said synchronous signal generating circuit (46);

a delay circuit (453, 140) provided to delay the detected signal (RF0) from said optical head (40) by a half cycle (T/2) of said synchronous signal (SYN) in response to the synchronous signal (SYN) from said synchronous signal generating circuit (46); and a differential circuit (454, 141) provided to detect, as a reproduced signal (RF), a difference between the detected signal (RF0) from said optical head (40) and the delayed detected signal (RF0) from said delay circuit (453, 140) in response to the synchronous signal (SYN) from said synchronous signal generating circuit.

16. A method of reproducing information from a magneto-optical recording medium (1), comprising the steps of:

alternately applying, to each of domains recorded on said magneto-optical recording medium (1), a magnetic field (10) in a first direction and a magnetic field (11) in a second direction opposite to said first direction;

irradiating said magneto-optical recording medium (1) with a laser beam and generating a detected signal (RF0) according to the reflected beam from said magneto-optical recording medium (1); and detecting, as a reproduced signal (RF), a difference between the detected signal (RF0) generated when said magnetic field (10) in the first direction is applied and the detected signal (RF0) generated when said magnetic field (11) in the second direction is applied.

17. The method of reproducing information according to claim 16, wherein said step of detecting includes delaying said generated detected signal (RF0), and detecting said difference based on said generated detected signal (RF0) and said delayed detected signal (RF2, RF4).

* * * * *

UNITED STATES PATENT AND TRADEMARK OFFICE
CERTIFICATE OF CORRECTION

PATENT NO.        : 6,418,088 B1                                    Page 1 of 1
APPLICATION NO. : 09/367934
DATED             : July 9, 2002
INVENTOR(S)       : Takagi et al.

It is certified that error appears in the above-identified patent and that said Letters Patent is hereby corrected as shown below:

Title Page, item 56, under "References Cited" section,
--FOREIGN PATENT DOCUMENTS
JP   8-7350   01-12-96-- should be added Title Page, item 56, under "FOREIGN PATENT DOCUMENTS" section,
--JP   10-312598   11-24-98-- should be added Title Page, item 56, under "FOREIGN PATENT DOCUMENTS" section,
--JP   3-219427   09-26-91-- should be added Signed and Sealed this Sixth Day of April, 2010

David J. Kappos
*Director of the United States Patent and Trademark Office*